US008932790B2

(12) United States Patent
Yamauchi et al.

(10) Patent No.: US 8,932,790 B2
(45) Date of Patent: Jan. 13, 2015

(54) TONER, DEVELOPER INCLUDING THE TONER, IMAGE FORMING APPARATUS USING THE TONER, AND BLOCK COPOLYMER

(71) Applicants: Yoshitaka Yamauchi, Shizuoka (JP); Masahide Yamada, Shizuoka (JP); Yoshihiro Moriya, Shizuoka (JP); Taichi Nemoto, Shizuoka (JP); Yukiko Nakajima, Kanagawa (JP); Keiji Makabe, Shizuoka (JP); Daiki Yamashita, Kanagawa (JP); Suzuka Amemori, Shizuoka (JP); Akiyoshi Sabu, Shizuoka (JP)

(72) Inventors: Yoshitaka Yamauchi, Shizuoka (JP); Masahide Yamada, Shizuoka (JP); Yoshihiro Moriya, Shizuoka (JP); Taichi Nemoto, Shizuoka (JP); Yukiko Nakajima, Kanagawa (JP); Keiji Makabe, Shizuoka (JP); Daiki Yamashita, Kanagawa (JP); Suzuka Amemori, Shizuoka (JP); Akiyoshi Sabu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 13/716,385

(22) Filed: Dec. 17, 2012

(65) Prior Publication Data

US 2013/0202996 A1 Aug. 8, 2013

(30) Foreign Application Priority Data

Feb. 3, 2012 (JP) ................................ 2012-022350

(51) Int. Cl.

| | |
|---|---|
| ***G03G 9/087*** | (2006.01) |
| ***C08G 63/91*** | (2006.01) |
| ***G03G 15/08*** | (2006.01) |
| ***G03G 9/08*** | (2006.01) |

(52) U.S. Cl.
CPC ............ *G03G 9/08755* (2013.01); *G03G 15/08* (2013.01); *G03G 9/0821* (2013.01); *G03G 9/08788* (2013.01); *G03G 9/08795* (2013.01); *G03G 9/08797* (2013.01)
USPC .................................... 430/109.4; 528/295.3

(58) Field of Classification Search
USPC .................................... 430/109.4; 528/295.3
See application file for complete search history.

(56) References Cited

U.S. PATENT DOCUMENTS

| | | | | |
|---|---|---|---|---|
| 2008/0227002 | A1* | 9/2008 | Moriya et al. | 430/48 |
| 2009/0003885 | A1* | 1/2009 | Sabu et al. | 399/252 |
| 2011/0065036 | A1* | 3/2011 | Inoue et al. | 430/108.2 |
| 2011/0104608 | A1 | 5/2011 | Nakajima et al. | |

(Continued)

FOREIGN PATENT DOCUMENTS

| | | |
|---|---|---|
| JP | 59-096123 | 6/1984 |
| JP | 7-033861 | 2/1995 |
| JP | 7-120975 | 5/1995 |
| JP | 2008-262179 | 10/2008 |

*Primary Examiner* — Hoa V Le

(74) *Attorney, Agent, or Firm* — Oblon, Spivak, McClelland, Maier & Neustadt, L.L.P.

(57) ABSTRACT

The toner includes a pigment; and a block copolymer having a polyester block A including a residual group of a hydroxycarboxylic acid, and a polyester block B including an anionic group. When cross-section of the block copolymer is observed by a tapping mode atomic force microscope to obtain a phase image of the cross-section, the polyester block B, which has relatively large phase delay, is dispersed as domains having an average size of from 20 nm to 100 nm in a domain of the polyester block A, which has relatively small phase delay. The block copolymer has a first glass transition temperature of from −20° C. to 20° C., and a second glass transition temperature of from 35° C. to 65° C. when the first and second glass transition temperatures are determined from a thermogram obtained by subjecting the block copolymer to differential scanning calorimetry (DSC) at a temperature rising speed of 5° C./min.

13 Claims, 5 Drawing Sheets

(56) References Cited

U.S. PATENT DOCUMENTS

| | | | |
|---|---|---|---|
| 2011/0124838 | A1 | 5/2011 | Kotsugai et al. |
| 2011/0129775 | A1 | 6/2011 | Sawada et al. |
| 2011/0177440 | A1 | 7/2011 | Yamada et al. |
| 2011/0200929 | A1 | 8/2011 | Karato et al. |
| 2011/0218301 | A1 | 9/2011 | Nemoto et al. |
| 2011/0223530 | A1 | 9/2011 | Inoue et al. |
| 2011/0236818 | A1 | 9/2011 | Yamada et al. |
| 2011/0281213 | A1 | 11/2011 | Sakashita et al. |
| 2011/0305987 | A1 | 12/2011 | Yohichiroh et al. |
| 2012/0065357 | A1 | 3/2012 | Yamauchi et al. |
| 2012/0070777 | A1 | 3/2012 | Makabe et al. |
| 2012/0129094 | A1 | 5/2012 | Yamauchi et al. |
| 2012/0225377 | A1 | 9/2012 | Yamauchi et al. |
| 2012/0282000 | A1 | 11/2012 | Nakayama et al. |
| 2012/0295188 | A1 | 11/2012 | Nakajima et al. |

* cited by examiner

TONER, DEVELOPER INCLUDING THE TONER, IMAGE FORMING APPARATUS USING THE TONER, AND BLOCK COPOLYMER

CROSS-REFERENCE TO RELATED APPLICATIONS

This patent application is based on and claims priority pursuant to 35 U.S.C. §119 to Japanese Patent Application No. 2012-022350 filed on Feb. 3, 2012 in the Japan Patent Office, the entire disclosure of which is hereby incorporated by reference herein.

FIELD OF THE INVENTION

The present invention relates to a toner, a developer including the toner, and an image forming apparatus using the toner. In addition, the present invention relates to a block copolymer.

BACKGROUND OF THE INVENTION

In electrophotographic image forming apparatuses and electrostatic recording apparatuses, an electrostatic latent image or a magnetic latent image formed on an image bearing member is developed with a toner to form a visible image. Specifically, in electrophotographic image forming apparatuses, an electrostatic image (a latent image) is formed on a photoreceptor, and the electrostatic latent image is developed with a toner to form a toner image on the photoreceptor. After the toner image is transferred onto a recording medium such as paper, the toner image is fixed to the recording medium by a method such as heating and the like.

Such a toner includes a binder resin as a main component, which is made from petroleum resources. Petroleum resources have problems such that the resources will be depleted in near future; and consumption of a large amount of petroleum resources emits a large amount of carbon dioxide to the atmosphere, resulting in global warming.

By using resins derived from vegetables, which grow by absorbing carbon dioxide in the atmosphere, for the binder resin of toner, carbon dioxide only circulates in the environment, thereby making it possible to solve the above-mentioned problems at the same time.

There is a proposal for a toner for use in electrophotography, which includes polylactic acid as a binder resin. Polylactic acid can be synthesized by subjecting lactic acid to dehydration condensation or by subjecting lactide to ring-opening polymerization.

However, when polylactic acid is used as a binder resin of toner, it is difficult for the toner to have a good combination of low temperature fixability and high temperature preservability.

There is another proposal for a toner, which includes a binder resin and a colorant and which is prepared by being granulated in an aqueous medium. The binder resin is a block copolymer including a polyester skeleton A including a unit obtained by subjecting $CH_3$—C*—H(—OH)(COOH) to dehydration condensation in the repeat unit thereof, and another polyester skeleton B not including the unit obtained by subjecting $CH_3$—C*—H(—OH)(COOH) to dehydration condensation in the repeat unit thereof. In this regard, the optical isomer ratio (i.e., enantiomer excess) X(%), which is defined as |X(L-isomer)−|X(D-isomer)|, is not greater than 80%, wherein X(L-isomer) represents the percentage of the L-isomer lactic acid monomer and X(D-isomer) represents the percentage of the D-isomer lactic acid monomer.

It is desired for such a binder resin to have good pigment dispersing ability.

For these reasons, the inventors recognized that there is a need for a toner which can solve the above-mentioned problems and which has a good combination of low temperature fixability, high temperature preservability, and pigment dispersing property.

BRIEF SUMMARY OF THE INVENTION

As an aspect of the present invention, a toner is provided which includes a pigment and a block copolymer having a polyester block A including a constituent unit derived from a hydroxycarboxylic acid (this constituent unit is hereinafter sometimes referred to as a residual group of a hydroxycarboxylic acid), and another polyester block B including an anionic group. The block copolymer has a configuration such that when cross-section of the block copolymer is observed by a tapping mode atomic force microscope to obtain a phase image of the cross-section, the polyester block B, which has relatively large phase delay, is dispersed as domains having an average size of from 20 nm to 100 nm in a domain of the polyester block A, which has relatively small phase delay. In addition, the block copolymer has a first glass transition temperature of from −20° C. to 20° C., and a second glass transition temperature of from 35° C. to 65° C. when first and second glass transition temperatures are determined from a thermogram obtained by subjecting the block copolymer to differential scanning calorimetry (DSC) at a temperature rising speed of 5° C./min.

As another aspect of the present invention, a developer is provided which includes the toner and a carrier. The toner itself can be used as a one component developer.

As yet another aspect of the present invention, an image forming apparatus is provided which includes a photoreceptor serving as an image bearing member; a charger to charge the photoreceptor; an irradiator to irradiate the charged photoreceptor to form an electrostatic latent image on the photoreceptor; a developing device to develop the electrostatic latent image with the developer to form a toner image on the photoreceptor; a transferring device to transfer the toner image onto a recording medium; and a fixing device to fix the toner image on the recording medium.

As a further aspect of the present invention, a block copolymer is provided which has a polyester block A including a constituent unit derived from a hydroxycarboxylic acid, and another polyester block B including an anionic group. The block copolymer has a configuration such that when cross-section of the copolymer is observed by a tapping mode atomic force microscope to obtain a phase image of the cross-section, the polyester block B, which has relatively large phase delay, is dispersed as domains having an average size of from 20 nm to 100 nm in a domain of the polyester block A, which has relatively small phase delay. In addition, the block copolymer has a first glass transition temperature of from −20° C. to 20° C., and a second glass transition temperature of from 35° C. to 65° C. when first and second glass transition temperatures are determined from a thermogram obtained by subjecting the block copolymer to differential scanning calorimetry (DSC) at a temperature rising speed of 5° C./min.

The aforementioned and other aspects, features and advantages will become apparent upon consideration of the following description of the preferred embodiments taken in conjunction with the accompanying drawings.

DETAILED DESCRIPTION OF THE INVENTION

The present invention will be described by reference to drawings.

The block copolymer included in the toner of the present invention has polyester block A including a constituent unit derived from a hydroxycarboxylic acid (i.e., a residual group of a hydroxycarboxylic acid), and another polyester block B including an anionic group.

In general, when the low temperature fixability of a toner is improved, the high temperature preservability of the toner deteriorates.

In the toner of the present invention, a domain having a relatively low glass transition temperature is dispersed in a domain having a relatively high glass transition temperature, and therefore the toner has a good combination of low temperature fixability and high temperature preservability, i.e., the trade-off problem between low temperature fixability and high temperature preservability can be solved.

It is preferable that the polyester block B does not include a constituent unit derived from a hydroxycarboxylic acid, so that the polyester block B has poor compatibility with the polyester block A, and thereby the polyester block B can be dispersed as a domain in a domain of the polyester block A.

In order to satisfactorily disperse a pigment in the binder resin, the block copolymer preferably has good affinity for the pigment.

In the toner of the present invention, the polyester block B, which has a relatively low glass transition temperature, has an anionic group, and therefore a pigment can be satisfactorily dispersed, i.e., a problem in that a pigment is eccentrically located on a surface portion of toner can be avoided.

Figure 1:
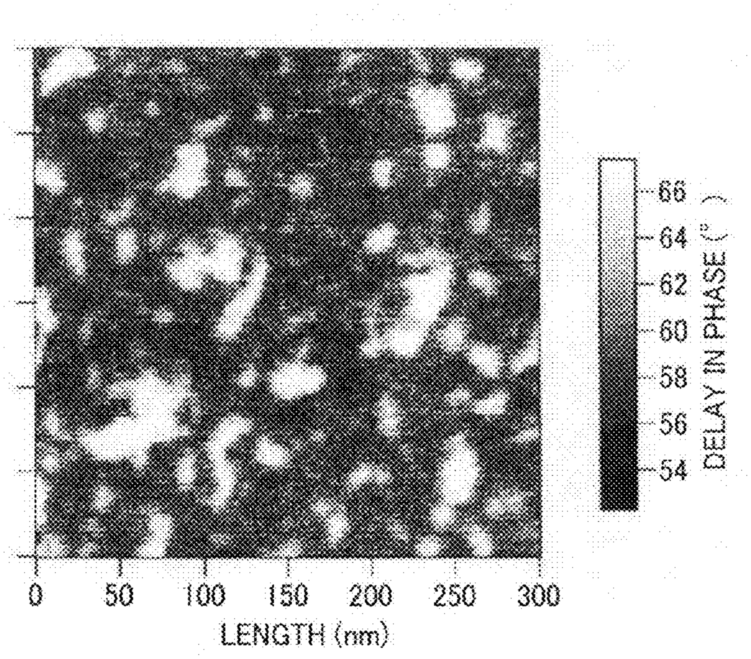
FIG. 1 is a schematic view illustrating a phase image of cross-section of a block copolymer.

When cross-section of a block copolymer for use in the toner of the present invention is observed by a tapping mode atomic force microscope to obtain a phase image of the cross-section, the polyester block B, which has relatively large phase delay, is dispersed as a domain in a domain of the polyester block A, which has relatively small phase delay. This is clear from FIG. 1, which is a schematic view illustrating a phase image of cross-section of a block copolymer.

The domains of the polyester block B have an average size of from 20 nm to 100 nm, and preferably from 30 nm to 70 nm. When the average size of the domains of the polyester block B is less than 20 nm, the low temperature fixability of the toner tends to deteriorate. In contrast, when the average size of the domains of the polyester block B is greater than 100 nm, the high temperature preservability of the toner tends to deteriorate. In this regard, the domain size means the maximum width of a domain, and the average domain size means the average of the maximum widths of domains.

The tapping mode atomic force microscope is introduced by Surface Science Letter, 290, 668 (1993), etc. As described in Polymer, 35, 5778 (1994), and Macromolecules, 28, 6773 (1995), a phase image can be obtained by profiling the surface of a sample while vibrating the sample with a cantilever.

In this measurement using such a tapping mode atomic force microscope, delay of phase of the cantilever is caused due to the viscoelasticity of surface of the sample. By mapping the phase delay, a phase image can be obtained. In this regard, a domain having a low glass transition temperature has a large phase delay, and a domain having a high glass transition temperature has a small phase delay.

In this measurement, a section of a sample (block copolymer) obtained using a microtome is used.

The block copolymer included in the toner of the present invention has a configuration such that the polyester block B is dispersed as a domain in a domain of the polyester block A, and therefore there are two different glass transition temperatures when the block copolymer is heated at a temperature rising speed of 5° C.

The first glass transition temperature of the block copolymer of the present invention is present in a range of from −20° C. to 20° C. When the first glass transition temperature is lower than −20° C., the high temperature preservability of the toner tends to deteriorate. In contrast, when the first glass transition temperature is higher than 20° C., the low temperature fixability of the toner tends to deteriorate.

The second glass transition temperature of the block copolymer of the present invention is present in a range of from 35° C. to 65° C. When the second glass transition temperature is lower than 35° C., the high temperature preservability of the toner tends to deteriorate. In contrast, when the second glass transition temperature is higher than 65° C., the low temperature fixability of the toner tends to deteriorate.

The glass transition temperatures of a block copolymer can be determined from an endothermic curve (thermogram) obtained by subjecting the block copolymer to differential scanning calorimetry (DSC). Specifically, the glass transition temperatures can be determined by analyzing the thermogram, which is obtained at second heating, using a mid-point method defined in ASTM D3418/82.

The block copolymer included in the toner preferably satisfies the following relation:

$$0<(HF_1-HF_2)/(HF_3-HF_4)\leq 1$$

wherein $HF_1$ and $HF_2$ respectively represents flows of heat (in units of W/g) at the onset temperature and the offset temperature when the first glass transition temperature of the block copolymer is determined, and $HF_3$ and $HF_4$ respectively represents flows of heat (in units of W/g) at the onset temperature and the offset temperature when the second glass transition temperature of the block copolymer is determined. $HF_1$, $HF_2$, $HF_3$ and $HF_4$ are illustrated in FIG. 2.

Figure 2:
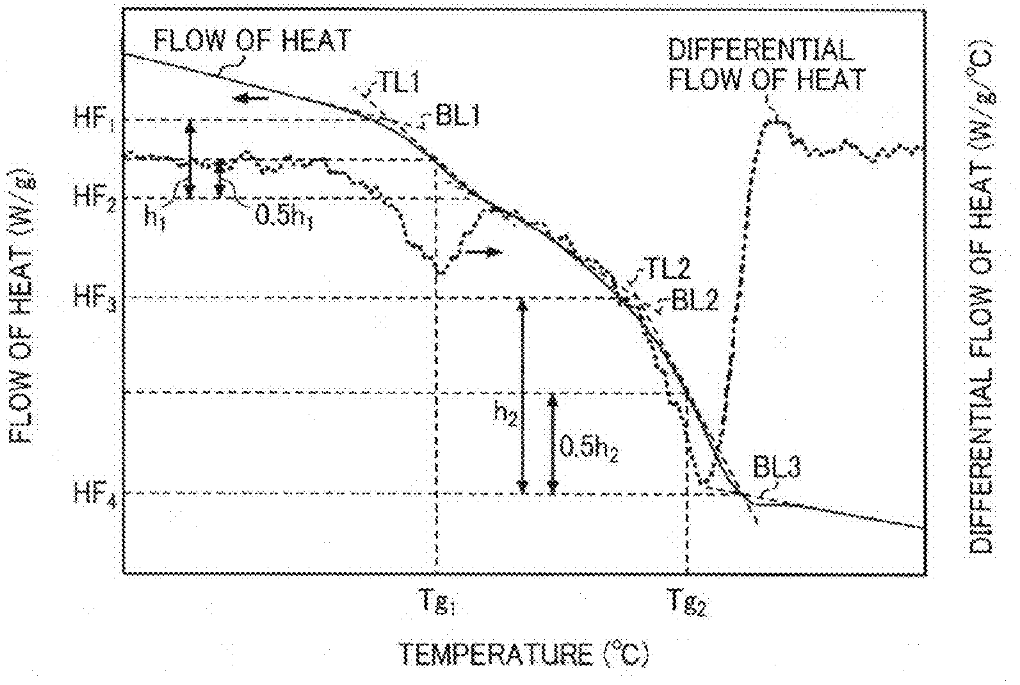
FIG. 2 illustrates an endothermic curve of a block copolymer when the block copolymer is subjected to differential scanning calorimetry.

Specifically, FIG. 2 illustrates an endothermic curve (i.e., thermogram) of a block copolymer when the block copolymer is subjected to differential scanning calorimetry (DSC). The endothermic curve includes a curve of flow of heat (hereinafter referred to a heat flow curve) indicated by a solid line, and a curve of differential flow of heat (hereinafter referred to a differential heat flow curve) indicated by a dotted line. $HF_1$ means heat flow at an intersection between a first tangent line TL1 at an inflection point of the heat flow curve and a first base line BL1 of the heat flow curve, and $HF_2$ means heat flow at an intersection between the first tangent line TL1 and a second base line BL2 of the heat flow curve. The first tangent line TL1 is used for determining the first glass transition temperature. In addition, $HF_3$ means heat flow at an intersection between a second tangent line TL2 at an inflection point of the heat flow curve and the second base line BL2, and $HF_2$ means heat flow at an intersection between the second tangent line TL2 and a third base line BL3 of the heat flow curve. The second tangent line TL2 is used for determining the second glass transition temperature. As illustrated in FIG. 2, the first glass transition temperature means a temperature at a point of the heat flow curve, which has a heat flow of $(HF_1+HF_2)/2$, and the second glass transition temperature means a temperature at a point of the heat flow curve, which has a heat flow of $(HF_3+HF_4)/2$.

When the ratio $(HF_1-HF_2)/(HF_3-HF_4)$ is greater than 1, the high temperature preservability of the toner tends to deteriorate.

The method for preparing the polyester block A is not particularly limited, and specific examples thereof include a method in which a hydroxycarboxylic acid is subjected to condensation polymerization, and a method in which a lactone and/or a lactide of a hydroxycarboxylic acid is subjected to ring-opening polymerization. Among these methods, the method in which a lactone and/or a lactide is subjected to ring-opening polymerization is preferable because the molecular weight of the polyester block A can be easily controlled.

Among hydroxycarboxylic acids, aliphatic hydroxycarboxylic acids are preferable because the resultant block copolymer has a good combination of transparency and thermal properties, and aliphatic hydroxycarboxylic acids having 2 to 6 carbon atoms are more preferable.

Specific examples of such aliphatic hydroxycarboxylic acids having 2 to 6 carbon atoms include, but are not limited thereto, hydroxyalkanoic acids such as lactic acid, glycolic acid, 3-hydroxybutylic acid, and 4-hydroxybutylic acid. Among these acids, lactic acid is preferable, and combinations of L-lactic acid and D-lactic acid are more preferable to form a domain having a high glass transition temperature and to impart a good combination of transparency and affinity for pigments to the resultant block copolymer, Lactones and lactides derived from hydroxycarboxylic acids are preferably lactones and lactides of the above-mentioned hydroxycarboxylic acids.

The polyester block A is preferably a polylactic acid block because of being decomposed by esterase in the environment.

Specific examples of the method for synthesizing a polylactic acid block include, but are not limited thereto, a method in which lactic acid is subjected to condensation polymerization, and a method in which lactide of lactic acid is subjected to ring-opening polymerization. Among these methods, the method in which lactide of lactic acid is subjected to ring-opening polymerization is preferable because the molecular weight of the resultant polylactic acid block can be easily controlled.

The method for synthesizing lactic acid is not particularly limited, and for example a method in which starch of corn, etc., is fermented can be used.

Lactic acid generated by hydrolyzing the polylactic acid block has an enantiomer excess (X) of not greater than 80% so that the block copolymer has a good combination of solubility and transparency.

The enantiomer excess (X) can be measured by chiral HPLC (high performance liquid chromatography).

The enantiomer excess (X) of lactic acid generated by hydrolyzing the polylactic acid block can be controlled by adjusting the enantiomer excess of lactic acid used for synthesizing the polylactic acid block.

The polyester block B is not particularly limited as long as the block has an anionic group, and the block can be dispersed as a domain in a domain of the polyester block A.

Since the block copolymer has a first glass transition temperature due to the polyester block B, it is important to prepare the polyester block B so that the first glass transition temperature falls in the range of from −20° C. to 20° C.

The polyester block B is preferably a residual group of a polyester having two or more hydroxyl groups and an anionic group. Namely, it is preferable to synthesize a block copolymer by a method in which a hydroxycarboxylic acid is subjected to polycondensation using a polyester having two or more hydroxyl groups and an anionic group as an initiator, or a method in which lactone or lactide of a hydroxycarboxylic acid is subjected to ring-opening polymerization using a polyester having two or more hydroxyl groups and an anionic group as an initiator. Such a block copolymer has good affinity for colorants (pigments). In addition, when a tri-block copolymer having a structure of ABA (block A-block B-block A) is used, the polyester block B can be easily dispersed as a domain in a domain of the polyester block A.

The anionic group included in the polyester block B is not particularly limited as long as the anionic group can improve the affinity of the block copolymer for pigments. Among such anionic groups, a $—SO_3^-$ group is preferable because of being able to catch a pigment, whose surface is positively charged, by an ionic interaction.

The content of an anionic group in the block copolymer is generally not greater than 1% by weight. When the content is greater than 1% by weight, the viscosity of the block copolymer tends to increase, thereby often making it hard to prepare a toner.

The polyester block B preferably has the following constituent units (1) to (3):

(1) a constituent unit, which is derived from a polyol having no anionic group and which has a formula $A-(OH)_m$, wherein A represents an alkyl group having 1 to 20 carbon atoms, an alkylene group, a substituted or unsubstituted aromatic group, or a heterocyclic group, and m is an integer of from 2 to 4;

(2) another constituent unit, which is derived from a polycarboxylic acid having no anionic group and which has a formula $B—(COOH)_n$, wherein B represents an alkyl group having 1 to 20 carbon atoms, an alkylene group, a substituted or unsubstituted aromatic group, or a heterocyclic group, and n is an integer of from 2 to 4; and (3) a constituent unit derived from a polycarboxylic acid having an anionic group.

Specific examples of the polyol having no anionic group include, but are not limited thereto, ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylol ethane, trimethylol propane, 1,3,5-trihydroxymethylbenzene, bisphenol A, ethylene oxide adducts of bisphenol A, propylene oxide adducts of bisphenol A, hydrogenated bisphenol A, ethylene oxide adducts of hydrogenated bisphenol A, and propylene oxide adducts of hydrogenated bisphenol A. These polyols can be used alone or in combination.

Specific examples of the polycarboxylic acid having no anionic group include, but are not limited thereto, maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isooctylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetriacarboxylic acid, tetra(methylenecarboxyl)methane, 1,2,7,8-octanetetracarboxylic acid, pyromellitic acid, trimer acids of EMPOL, cyclohexanedicarboxylic acid, cyclohexenedicarboxylic acid, butanetetracarboxylic acid, diphenylsulfonetetracarboxylic acid, and ethylene glycol bis trimellitate. These polycarboxylic acids can be used alone or in combination.

Specific examples of the polycarboxylic acid having an anionic group include, but are not limited thereto, dimethylsodium 5-sulfoisophthalate. One or more polycarboxylic acids having no anionic group can be used.

The polyester block B preferably has a branched structure, more preferably a constituent unit derived from a carboxylic acid having three or more hydroxyl groups, and even more preferably a constituent unit derived from trimellitic acid. When the polyester block B has such a structure, the average size of domains of the polyester block B can be decreased.

The content of a constituent unit derived from a carboxylic acid having three or more hydroxyl groups in the polyester block B is generally not less than 1.5% by mole. When the content is less than 1.5% by mole, the average size of domains of the polyester block B tends to increase.

The content of a constituent unit derived from a carboxylic acid having three or more hydroxyl groups in the polyester block B is generally not greater than 3% by mole. When the content is greater than 3% by mole, the low temperature fixability of the resultant toner tends to deteriorate.

The content of the polyester block B in the block copolymer is generally from 25% to 50% by weight, and preferably from 25% to 40% by weight. The number average molecular weight of the polyester block B is from 3,000 to 5,000, and preferably from 3,000 to 4,000. When the content of the polyester block B is less than 25% by weight or the number average molecular weight thereof is less than 3,000, the average domain size of the polyester block B often becomes less than 20 nm. In contrast, when the content of the polyester block B is greater than 50% by weight or the number average molecular weight thereof is greater than 5,000, the average domain size of the polyester block B often becomes greater than 100 nm.

The content of the polyester block B in the block copolymer can be determined by NMR, IR or pyrolysis GC-MS.

The number average molecular weight of a polyester block B in a block copolymer can be determined by the following method. Specifically, the number average absolute molecular weight of the block copolymer is determined by a light scattering method. Next, the number average absolute molecular weight of the polyester block B is determined from the number average absolute molecular weight of the block copolymer and the content of the polyester block B in the block copolymer. Next, the number average molecular weights of several reference polyesters, which have the same constituent unit as that of the polyester block B and whose number average absolute molecular weights are known, are measured with GPC (gel permeation chromatography). The number average molecular weight of the polyester block B can be determined by calculation from the number average absolute molecular weights thereof and the several reference polyesters, and the number average molecular weights of the several reference polyesters.

The number average molecular weight of the block copolymer of the present invention is generally not greater than 20,000, and is preferably from 8,000 to 15,000. When the number average molecular weight of the block copolymer is greater than 20,000, the low temperature fixability of the toner tends to deteriorate.

The toner of the present invention includes toner particles including the block copolymer of the present invention and a pigment, and can optionally include other components such as release agents, charge controlling agents, fluidity improving agents, cleanability improving agents, and magnetic materials.

Any known pigments can be used for the pigment.

Specific examples of yellow pigments include Cadmium Yellow, Mineral Fast Yellow, Nickel Titan Yellow, Naples Yellow, NAPHTHOL YELLOW S, HANSA YELLOW G, HANSA YELLOW 10G, BENZIDINE YELLOW GR, Quinoline Yellow Lake, PERMANENT YELLOW NCG, and Tartrazine Lake.

Specific examples of orange pigments include Molybdenum Orange, PERMANENT ORANGE GTR, Pyrazolone Orange, VULVAN ORANGE, INDANTHRENE BRILLIANT ORANGE RK, BENZIDINE ORANGE G, and INDANTHRENE BRILLIANT ORANGE GK.

Specific examples of red pigments include red iron oxide, cadmium red, PERMANENT RED 4R, Lithol Red, Pyrazolone Red, Watchung Red calcium salt, Lake Red D, Brilliant Carmine 6B, Eosin Lake, Rhodamine Lake B, Alizarin Lake, and Brilliant Carmine 3B.

Specific examples of violet pigments include Fast Violet B, and Methyl Violet Lake.

Specific examples of blue pigments include cobalt blue, Alkali Blue, Victoria Blue Lake, Phthalocyanine Blue, metal-free Phthalocyanine Blue, partially-chlorinated Phthalocyanine Blue, Fast Sky Blue, and INDANTHRENE BLUE BC.

Specific examples of green pigments include Chrome Green, chromium oxide, Pigment Green B, and Malachite Green Lake.

Specific examples of black pigments include carbon black, oil furnace black, channel black, lamp black, acetylene black, azine dyes such as Aniline Black, metal salts of azo dyes, metal oxides, and complex metal oxides.

These pigments can be used alone or in combination.

Master batches, which are complexes of a pigment with a resin (binder resin), can be used as the pigment when preparing the toner of the present invention.

Such master batches can be prepared by mixing a resin and a pigment, and kneading the mixture while applying a high shearing force thereto using a dispersing device such as three roll mills. In this case, an organic solvent is preferably added to enhance the interaction between the pigment and the resin. In addition, a flushing method, in which an aqueous paste including a pigment and water is mixed with a resin dissolved in an organic solvent, the mixture is kneaded to transfer the pigment from the aqueous phase to the resin side (i.e., the oil phase), and then the organic solvent (and water, if desired) is removed from the kneaded mixture, can be preferably used because the resultant wet cake can be used without being dried.

The content of such a pigment in the toner is generally from 1% to 15% by weight, and preferably from 3% to 10% by weight, based on the weight of the toner. When the content is less than 1% by weight, the tinting power of the toner tends to deteriorate. In contrast, when the content is greater than 15% by weight, it often becomes hard to satisfactorily disperse the pigment in the toner.

Specific examples of release agents for use in the toner include, but are not limited thereto, vegetable waxes such as carnauba waxes, cotton waxes, Japan waxes, and rice waxes; animal waxes such as bees waxes, and lanolin; mineral waxes such as ozocerite and ceresin waxes; petroleum waxes such as paraffin waxes, microcrystalline waxes, and petrolatum; synthesized hydrocarbon waxes such as Fischer-Tropsch waxes, and polyethylene waxes; synthesized waxes such as esters, ketones and ethers; amides and imides such as 12-hydroxystearamide, stearamide, and phthalic anhydride imide; chlorinated hydrocarbons; homopolymers of long-chain alkyl acrylates such as poly(n-stearyl methacrylate, and poly(n-lauryl methacrylate); copolymers of long-chain alkyl acrylates such as n-stearyl acrylate-ethyl methacrylate copolymers; and crystalline polymers having a long alkyl group in a side chain thereof.

These release agents can be used alone or in combination.

The melting point of the release agent included in the toner is generally from 50° C. to 120° C., and preferably from 60° C. to 90° C. When the melting point of the release agent is lower than 50° C., the high temperature preservability of the toner tends to deteriorate. In contrast, when the melting point of the release agent is higher than 120° C., the low temperature fixability of the toner tends to deteriorate.

The release agent preferably has a melt viscosity of from 5 to 1,000 mP·s (cps), and more preferably from 10 to 100 mP·s (cps) at a temperature 20° C. higher than the melting point thereof. When the melt viscosity of the release agent is lower than 5 mP·s, it is often hard to impart good releasability to the toner. In contrast, when the melt viscosity is higher than 1,000 mP·s, it is often hard to impart good low temperature fixability to the toner.

The content of such a release agent in the toner is generally not greater than 40% by weight, and preferably from 3% to 30% by weight. When the content is higher than 40% by weight, the fluidity of the toner tends to deteriorate.

Any known charge controlling agents can be used for the toner of the present invention.

Suitable materials for use as the charge controlling agent include Nigrosine dyes, triphenyl methane dyes, chromium-containing metal complex dyes, molybdic acid chelate pigments, Rhodamine dyes, alkoxyamines, quaternary ammonium salts, fluorine-modified quaternary ammonium salts, alkylamides, phosphor and its compounds, tungsten and its compounds, fluorine-containing surfactants, metal salts of salicylic acid, metal salts of salicylic acid derivatives, copper phthalocyanine, perylene, quinacridone, azo pigments, and polymer compounds having a functional group such as sulfonate groups, carboxylate groups, and quaternary ammonium groups. These materials can be used alone or in combination.

Specific examples of marketed charge controlling agents include BONTRON 03 (Nigrosine dye), BONTRON P-51 (quaternary ammonium salt), BONTRON S-34 (metal-containing azo dye), BONTRON E-82 (metal complex of oxynaphthoic acid), BONTRON E-84 (metal complex of salicylic acid), and BONTRON E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and COPY CHARGE NX VP434 (quaternary ammonium salt), which are manufactured by Hoechst AG; and LRA-901, and LR-147 (boron complex), which are manufactured by Japan Carlit Co., Ltd.

The content of such a charge controlling agent in the toner is generally from 0.1% to 10% by weight, and preferably from 0.2% to 5% by weight, based on the weight of the block copolymer included in the toner. When the content is less than 0.1% by weight, the charging ability of the toner tends to deteriorate. In contrast, when the content is greater than 10% by weight, the fluidity of the toner tends to deteriorate and the image density of toner images often decreases.

Specific examples of the fluidity improving agent to be optionally included in the toner include, but are not limited thereto, silica, alumina, titanium oxide, barium titanate, magnesium titanate, calcium titanate, strontium titanate, zinc oxide, tin oxide, quartz sand, clay, mica, wollastonite, diatom earth, chromium oxide, cerium oxide, red iron oxide, antimony trioxide, magnesium oxide, zirconium oxide, barium oxide, barium carbonate, calcium carbonate, silicon carbide, and silicon nitride. These materials can be used alone or in combination.

The fluidity improving agent to be optionally included in the toner preferably has an average primary particle diameter of from 5 nm to 2 μm, and more preferably from 5 nm to 500 nm.

The content of the fluidity improving agent in the toner is generally from 0.01% to 5.0% by weight, and preferably from 0.01% to 2.0% by weight.

It is preferable that the fluidity improving agent is subjected to a hydrophobizing treatment using a hydrophobizing agent to prevent deterioration of fluidity and charging property of the toner under high humidity conditions.

Specific examples of the fluidity improving agent include silane coupling agents, silylating agents, silane coupling agents having a fluorinated alkyl group, organic titanate coupling agents, aluminum coupling agents, silicone oils, and modified silicone oils.

Specific examples of the cleanability improving agent to be optionally included in the toner include, but are not limited thereto, fatty acid metal salts such as zinc stearate, and calcium stearate; and particulate resins, which are prepared by a soap-free emulsion polymerization method and which preferably have a volume average particle diameter of from 0.01 μm to 1 μm, such as particulate polymethyl methacrylate, and particulate polystyrene.

Specific examples of the magnetic material to be optionally included in the toner include, but are not limited thereto, powders of iron, magnetite and ferrite. Among these materials, white magnetic materials are preferable when the magnetic material is used for color toners.

The toner of the present invention preferably has a volume average particle diameter of from 3 μm to 8 μm. The volume average particle diameter and particle diameter distribution of the toner are measured using a particle diameter measuring instrument, MULTISIZER II from Beckman Coulter Inc.

The method for preparing the toner of the present invention typically includes the following processes:

(1) a first liquid preparation process of dissolving or dispersing toner components, which include a block copolymer and a pigment and which optionally include other components such as release agents, and charge controlling agents, in an organic solvent to prepare a first liquid;

(2) a second liquid preparation process of emulsifying or dispersing the first liquid in an aqueous medium to prepare a second liquid; and (3) an organic solvent removing process of removing the organic solvent from the second liquid to prepare toner particles.

The organic solvent for use in the first liquid is not particularly limited and any known organic solvents can be used as long as the solvents can dissolve or disperse toner components. Specific examples of such organic solvents include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These solvents can be used alone or in combination. Among these solvents, ethyl acetate is preferable.

The weight ratio (S/T) of the organic solvent (S) to the toner components (T) is generally from 0.4 to 3, preferably from 0.6 to 1.4, and more preferably from 0.8 to 1.2.

The material for use as the aqueous medium is not particularly limited, and water and any known solvents which can be mixed with water can be used for the aqueous medium. Among these solvents, water is preferable.

Specific examples of such solvents to be mixed with water include alcohols such as methanol, isopropanol, and ethylene glycol; dimethylformamide; tetrahydrofuran; cellosolves such as methyl cellosolve; and lower ketones such as acetone and methyl ethyl ketone. These solvents can be used alone or in combination.

The aqueous medium preferably include a particulate resin. The aqueous medium including a particulate resin can be prepared by dispersing the particulate resin in an aqueous medium. The content of such a particulate resin in the aqueous medium is generally from 0.5% to 10% by weight.

The particulate resin is not particularly limited, and any known resins capable of being dispersed in aqueous media can be used. Specific examples of such resins include vinyl resins, polyurethane resins, epoxy resins, polyester resins, polyamide resins, polyimide resins, silicone resins, phenolic resins, melamine resins, urea resins, aniline resins, ionomer resins, and polycarbonate resins. Among these resins, vinyl resins, polyurethane resins, epoxy resins, and polyester resins can be preferably used because fine spherical resin particles can be easily synthesized.

Specific examples of the vinyl resins include styrene-(meth)acrylate copolymers, styrene-butadiene copolymers, (meth)acrylic acid-acrylate copolymers, styrene-acrylonitrile copolymers, styrene-maleic anhydride copolymers, and styrene-(meth)acrylic acid copolymers.

The particulate resin included in the aqueous medium may be crosslinked. In order to prepare a crosslinked particulate acrylic resin, one or more monomers having two or more functional groups are preferably used. Specific examples of such monomers include, but are not limited thereto, sodium salt of sulfate of an ethylene oxide adduct of methacrylic acid (ELEMINOL RS-30 from Sanyo Chemical Industries Ltd.), divinyl benzene, and 1,6-hexanediol diacrylate.

Specific examples of the method for preparing a resin dispersion include, but are not limited thereto, the following methods (1)-(8):

(1) A method in which one or more vinyl monomers are polymerized using a method such as suspension polymerization methods, emulsion polymerization methods, seed polymerization methods and dispersion polymerization to directly prepare an aqueous dispersion of a vinyl resin;

(2) A method in which a precursor (monomer or oligomer) of a polyaddition type resin or a polycondensation type resin such as polyester resins, polyurethane resins and epoxy resins or a solution of the precursor is dispersed in an aqueous medium in the presence of a proper dispersant, and the dispersion is heated so that the precursor is polymerized and optionally crosslinked (using a crosslinking agent), resulting in preparation of an aqueous dispersion of the resin;

(3) A method in which an emulsifier is dissolved in a precursor (monomer or oligomer) of a polyaddition type resin or a polycondensation type resin such as polyester resins, polyurethane resins and epoxy resins or a solution of the precursor (or a melted precursor), and then water is added to the mixture to perform phase inversion, followed by polymerization, resulting in preparation of an aqueous dispersion of the resin;

(4) A method in which a resin prepared by a polymerization method such as addition polymerization, ring-opening polymerization, polyaddition reaction, addition condensation and polycondensation polymerization is pulverized with a pulverizer such as mechanical rotation pulverizers and jet air pulverizers, followed by classification, to prepare a particulate resin, and the particulate resin is dispersed in water using a proper dispersant to prepare an aqueous dispersion of the particulate resin;

(5) A method in which a resin prepared by a polymerization method such as addition polymerization, ring-opening polymerization, polyaddition reaction, addition condensation and polycondensation polymerization is dissolved in a solvent, followed by spraying of the solution to prepare a particulate resin, and the particulate resin is dispersed in water using a proper dispersant to prepare an aqueous dispersion of the particulate resin;

(6) A method in which a resin prepared by a polymerization method such as addition polymerization, ring-opening polymerization, polyaddition reaction, addition condensation and polycondensation polymerization is dissolved in a solvent to prepare a resin solution; the resin solution is mixed with a solvent which cannot dissolve the resin, or the solution is cooled, to precipitate particles of the resin therein; the solvent is separated from the particulate resin; and then the particulate resin is dispersed in water using a proper dispersant to prepare an aqueous dispersion of the resin;

(7) A method in which a resin prepared by a polymerization method such as addition polymerization, ring-opening polymerization, polyaddition reaction, addition condensation and polycondensation polymerization is dissolved in a solvent, and the solution is dispersed in an aqueous medium using a proper dispersant, followed by removal of the solvent by heating or depressurizing, to prepare an aqueous dispersion of the resin; and (8) A method in which a resin prepared by a polymerization method such as addition polymerization, ring-opening polymerization, polyaddition reaction, addition condensation and polycondensation polymerization is dissolved in a solvent, the solution is mixed with an emulsifier, and then water is added thereto to perform phase inversion, followed by removal of the solvent, to prepare an aqueous dispersion of the resin.

The aqueous medium preferably includes a surfactant (such as anionic surfactants, cationic surfactants, nonionic surfactants, and ampholytic surfactants) to stabilize droplets of the first liquid (i.e., solution or dispersion of the toner components) in the aqueous medium.

Suitable materials for use as the anionic surfactants include alkylbenzenesulfonic acid salts, α-olefin sulfonic acid salts, and phosphoric acid salts. Among anionic surfactants, anionic surfactants having a fluoroalkyl group are preferable.

Specific examples of such anionic surfactants having a fluoroalkyl group include fluoroalkyl(C2-10) carboxylic acids and their metal salts, disodium perfluorooctanesulfonylglutamate, sodium 3-{ω-fluoroalkyl(C6-C11)oxy}-1-alkyl(C3-C4) sulfonates, sodium 3-{ω-fluoroalkanoyl(C6-C8)-N-ethylamino}-1-propanesulfonates, fluoroalkyl(C11-C20)carboxylic acids and their metal salts, perfluoroalkyl (C7-C13)carboxylic acids and their metal salts, perfluoroalkyl(C4-C12)sulfonates and their metal salts, perfluorooctanesulfonic acid diethanol amides, N-propyl-N-(2-hydroxyethyl)perfluorooctanesulfone amide, perfluoroalkyl (C6-C10)sulfoneamidepropyltrimethylammonium salts, salts of perfluoroalkyl(C6-C10)-N-ethylsulfonyl glycin, and monoperfluoroalkyl(C6-C16)ethylphosphates.

Specific examples of the marketed products of such anionic surfactants having a fluoroalkyl group include SARFRON 5-111, S-112 and S-113, which are manufactured by Asahi Glass Co., Ltd.; FLUORAD FC-93, FC-95, FC-98 and FC-129, which are manufactured by Sumitomo 3M Ltd.; UNIDYNE DS-101 and DS-102, which are manufactured by Daikin Industries, Ltd.; MEGAFACE F-110, F-120, F-113, F-191, F-812 and F-833 which are manufactured by DIC Corp.; ECTOP EF-102, 103, 104, 105, 112, 123A, 123B, 306A, 501, 201 and 204, which are manufactured by Tohchem Products Co., Ltd.; FUTARGENT F-100 and F150 manufactured by Neos Co., Ltd.; etc.

Suitable materials for use as the cationic surfactant include amine salt type surfactants, quaternary ammonium salt type surfactants, and cationic surfactants having a fluoroalkyl group.

Specific examples of the amine salt type cationic surfactants include alkyl amine salts, amino alcohol fatty acid derivatives, polyamine fatty acid derivatives, and imidazoline.

Specific examples of the quaternary ammonium salt type cationic surfactants include alkyltrimethyl ammonium salts, dialkyldimethyl ammonium salts, alkyldimethylbenzyl ammonium salts, pyridinium salts, alkylisoquinolinium salts, and benzethonium chloride.

Specific examples of the cationic surfactants having a fluoroalkyl group include primary, secondary and tertiary aliphatic amino acids, quaternary aliphatic ammonium salts such as propyltrimethylammonium salts of perfluoroalkyl (C6-C10)sulfoneamide, benzalkonium salts, benzethonium chloride, pyridinium salts, and imidazolinium salts, all of which have a fluoroalkyl group Specific examples of marketed products of cationic surfactants having a fluoroalkyl group include SARFRON S-121 (from Asahi Glass Co., Ltd.); FLUORAD FC-135 (from Sumitomo 3M Ltd.); UNIDYNE DS-202 (from Daikin Industries, Ltd.); MEGAFACE F-150 and F-824 (from DIC Corp.); ECTOP EF-132 (from Tohchem Products Co., Ltd.); and FUTARGENT F-300 (from Neos Co., Ltd.).

Specific examples of the nonionic surfactants include fatty acid amide derivatives, and polyalcohol derivatives.

Specific examples of the ampholytic surfactants include alanine, dodecylbis(aminoethyl)glycin, bis(octylaminoethyle)glycin, and N-alkyl-N,N-dimethylammonium betaine.

The aqueous medium can include a particulate inorganic material instead of a particulate resin. Specific examples thereof include tricalcium phosphate, calcium carbonate, titanium oxide, silica, and hydroxyapatite.

The aqueous medium can further include a dispersion stabilizer such as calcium phosphate.

When the first liquid (solution or dispersion of toner components) is emulsified or dispersed in the aqueous medium, a dispersing device is used. Specific examples of the dispersing device include batch emulsifiers such as homogenizers (from IKA), POLYTRON (from Kinematica AG), and TK AUTO HOMOMIXER (from Tokushu Kika Kogyo Co., Ltd.); continuous emulsifiers such as EBARA MILDER (Ebara Corp.), TK FILMICS and TK PIPE LINE HOMOMIXER (from Tokushu Kika Kogyo Co., Ltd.), colloid mill (from Kobelco Eco-Solutions Co., Ltd.), slasher and trigonal wet pulverizer (from Mitsui Miike Machinery Co., Ltd.), CAVITRON (from Eurotec), and FINE FLOW MILL (from Pacific Machinery & Engineering Co., Ltd.); high pressure emulsifiers such as micro fluidizer (Mizuho Industrial Co., Ltd.), NANOMIZER (from Nanomizer Technology), and APV GAULIN (from Gaulin); emulsifiers using a film such as emulsifiers from Reica Co., Ltd.; vibration emulsifiers such as VIBRO MIXER (from Reica Co., Ltd.); and supersonic emulsifiers such as supersonic homogenizers (from Branson). Among these emulsifiers, APV GAULIN, homogenizer, TK AUTO HOMO MIXER, EBARA MILDER, TK FILMIX, and TK PIPELINE HOMOMIXER are preferably used because the particles of the first liquid can have sharp particle diameter distribution.

Specific examples of the method for removing the organic solvent from the second liquid (i.e., emulsion or dispersion of the first liquid in the aqueous medium) include a method in which the second liquid is heated to evaporate the organic solvent in the oil droplets of the first liquid, thereby removing the organic solvent from the second liquid; and a method in which the second liquid is sprayed into dry atmosphere to remove the organic solvent therefrom.

After the organic solvent is removed from the second liquid, the resultant particles may be subjected to a washing process, a drying process, and a classifying process, if desired. In the classifying process, for example, fine particles are removed from the thus prepared particles (toner particles) using a cyclone, a decanter, or a classifier using a centrifugal force. The classifying process may be performed after the drying process.

When a compound such as calcium phosphate, which is soluble in an acid or alkali, is used as a dispersion stabilizer, the resultant toner particles are preferably mixed with an acid such as hydrochloric acid, followed by washing with water to remove such a dispersion stabilizer from the toner particles.

It is possible that the thus prepared toner particles prepared above are mixed with external additives such as charge controlling agents, fluidity improving agents, cleanability improving agents, and magnetic materials. In this mixing process, a mechanical impact may be applied if desired. Specific examples of the mechanical impact applying method include a method in which an impact is applied by a blade rotating at a high speed, and a method in which the mixture is fed into high speed airflow to be collided with a collision plate.

Specific examples of such mechanical impact applicators include, but are not limited thereto, ONG MILL (manufactured by Hosokawa Micron Co., Ltd.), modified I TYPE MILL in which the pressure of air supplied is reduced (manufactured by Nippon Pneumatic Mfg. Co., Ltd.), HYBRIDIZATION SYSTEM (manufactured by Nara Machine Co., Ltd.), KRYPTRON SYSTEM (manufactured by Kawasaki Heavy Industries, Ltd.), and automatic mortars.

The developer of the present invention includes the toner of the present invention, and can further include a carrier. Namely, the developer of the present invention may be a one-component developer including the toner and no carrier, or a two-component developer including the toner and a carrier.

The content of a carrier in the two component developer of the present invention is generally from 90% to 98% by weight, and preferably from 93% to 97% by weight. The carrier is preferably covered with a resin layer.

The material constituting the core of the carrier is not particularly limited, and specific examples of the material include manganese-strontium based magnetic materials, and manganese-magnesium based magnetic materials, which have a magnetic moment of from 50 to 90 emu/g (0.05 to 0.09 $A \cdot m^2/g$); iron having a magnetization of not less than 100 emu/g; magnetite having a magnetic moment of from 75 to 120 emu/g (0.075 to 0.120 A $M^2/g$); and copper-zinc based magnetic materials having a magnetic moment of from 30 to 80 emu/g (0.03 to 0.08 $A \cdot m^2/g$). These materials can be used alone or in combination.

The core of the carrier generally has a volume average particle diameter of from 10 μm to 150 μm, and preferably from 20 μm to 80 μm.

Specific examples of the material of the resin layer of the carrier include amino resins (such as urea-formaldehyde resins, melamine resins, benzoguanamine resins, urea resins, and polyamide resins), epoxy resins, vinyl resins (such as acrylic resins, polymethyl methacrylate, polyacrylonitirile, polyvinyl acetate, polyvinyl alcohol, and polyvinyl butyral), polystyrene, styrene-acrylic copolymers, halogenated olefin resins (such as polyvinyl chloride), polyester resins (such as polyethylene terephthalate and polybutylene terephthalate), polycarbonate resins, polyethylene resins, polyvinyl fluoride resins, polyvinylidene fluoride resins, polytrifluoroethylene resins, polyhexafluoropropylene resins, vinylidene fluoride-acrylic copolymers, vinylidene fluoride-vinyl fluoride copolymers, fluoro-terpolymers of tetrafluoroethylene, vinylidene fluoride and a monomer including no fluorine atom, and silicone resins. These resins can be used alone or in combination. Among these resins, silicone resins are preferable.

The resin layer can include an electroconductive powder if desired. Specific examples thereof include metal powders, carbon blacks, titanium oxide powders, tin oxide powders, and zinc oxide powders. The powder preferably has an average particle diameter of not greater than 1 μm.

The weight ratio of the resin layer in the carrier is generally from 0.01% to 5.0% by weight based on the weight of the carrier.

The method for forming a resin layer (such as a silicone resin layer) is not particularly limited, and for example, a method in which a coating liquid prepared by dissolving a silicone resin in a solvent is applied on the surface of a core material, followed by drying and heating can be used.

Specific examples of the coating method include, but are not limited thereto, dipping methods, spraying methods, and methods using a brush.

Specific examples of the solvent include, but are not limited thereto, toluene, xylene, methyl ethyl ketone, methyl isobutyl ketone, n-butyl acetate, and cellosolves.

Specific examples of the heating methods include external heating methods, and internal heating methods.

Specific examples of the heating devices include fixed electric furnaces, fluid electric furnaces, rotary electric furnaces, burner furnaces, and devices irradiating microwaves.

The image forming apparatus of the present invention includes a photoreceptor serving as an image bearing member, a charger to charge the photoreceptor, an irradiator to irradiate the charged photoreceptor to form an electrostatic latent image thereon, a developing device to develop the electrostatic latent image with the developer of the present invention including the toner of the present invention to form a toner image on the photoreceptor, a transferring device to transfer the toner image onto a recording medium optionally via an intermediate transfer medium, and a fixing device to fix the toner image to the recording medium. The image forming apparatus optionally includes a discharger to reduce residual charges remaining on the photoreceptor even after the toner image is transferred, a cleaner to clean the surface of the photoreceptor after the toner image is transferred, a recycling device to recycle the toner collected by the cleaner, and a controller to control the devices of the image forming apparatus.

The photoreceptor typically has a drum-shape.

The material serving as the photosensitive material of the photoreceptor is not particularly limited, and for example, inorganic compounds such as amorphous silicon and selenium, and organic compounds such as polysilane and phthalopolymethine can be used. Among these materials, amorphous silicon is preferable because of having a relatively long life.

Any known chargers can be used as the charger as long as the chargers can uniformly charge the surface of the photoreceptor. Specific examples thereof include contact chargers such as electroconductive or semiconductive rollers, brushes, films and rubber blades, and non-contact chargers such as corotrons and scorotrons. It is preferable for such contact or noncontact chargers to apply a DC voltage or a DC voltage, on which an AC voltage is superimposed, to the surface of the photoreceptor. Among these chargers, short-range chargers, which are set so as to be close to the surface of the photoreceptor with a gap tape therebetween, are more preferable.

The irradiator is not particularly limited, and any known irradiating devices can be used therefor as long as the devices can form an electrostatic latent image on the charged photoreceptor by irradiating the photoreceptor. Specific examples thereof include optical systems for use in copiers, rod lens arrays, optical systems using a laser, and a liquid crystal shutter, but are not limited thereto.

The irradiator may irradiates the charged photoreceptor from the inside (backside) of the photoreceptor.

The developing device is not particularly limited as long as the developing device can develop an electrostatic latent image on the photoreceptor using the developer of the present invention including the toner of the present invention to form a toner image on the photoreceptor. Specific examples thereof include developing devices capable of containing the developer of the present invention while supplying the developer to the electrostatic latent image in a contact or non-contact manner.

The developing device typically has an agitator to agitate the developer, and a rotatable magnet roller. In such a developing device, when the toner and the carrier are agitated, the toner is charged, and the developer is held by the surface of the rotated magnet roller while forming magnetic brush thereon. Since the magnet roller is set so as to be close to the surface of the photoreceptor, part of the toner included in the magnetic brush is transferred to the surface of the photoreceptor by an electric force, thereby developing the electrostatic latent image, resulting in formation of a toner image on the surface of the photoreceptor.

The transfer device is not particularly limited as long as the device can transfer the toner image on the photoreceptor to a recording medium. Specific examples thereof include corona dischargers, belts, rollers, pressure rollers, and transfer devices using an adhesive force.

The transfer device preferably has a primary transfer device to transfer a toner image on the photoreceptor to an intermediate transfer medium, and a secondary transfer device to transfer the toner image on the intermediate transfer medium to a recording medium.

The intermediate transfer medium is not particularly limited as long as a toner image on the photoreceptor can be transferred onto a recording medium. Specific examples thereof include transfer belts. The recording medium is not particularly limited, and for example, paper sheets can be used.

The fixing device is not particularly limited as long as the device can fix a toner image on a recording medium. Specific examples thereof include a combination of a heat roller and a pressure roller, and a combination of a heat roller, a pressure roller and an endless belt.

The fixing device preferably includes a heating member, a film contacting the heating member, and a pressing member contacting the heating member with the film therebetween, and has a configuration such that a recording medium having a toner image thereon is fed through the nip between the film and the pressing member.

The temperature at which a recording medium bearing a toner image thereon is heated by the fixing device is generally from 80° C. to 200° C.

The fixing device may be a light fixing device to irradiate a toner image on a recording medium to fix the toner image thereon.

The discharger is not particularly limited as long as the discharger can discharge the photoreceptor after the toner image thereon is transferred. Specific examples thereof include discharging lamps.

The cleaner is not particularly limited as long as the cleaner can remove toner particles and foreign materials remaining on the photoreceptor. Specific examples thereof include magnetic brushes, electrostatic brushes, magnetic rollers, blades, brushes and webs.

The recycling device is not particularly limited as long as the device can feed the toner collected by the cleaner to the developing device.

The controller is not particularly limited as long as the controller can control the operations of each device of the image forming apparatus. Specific examples thereof include sequencers and computers.

Figure 3:
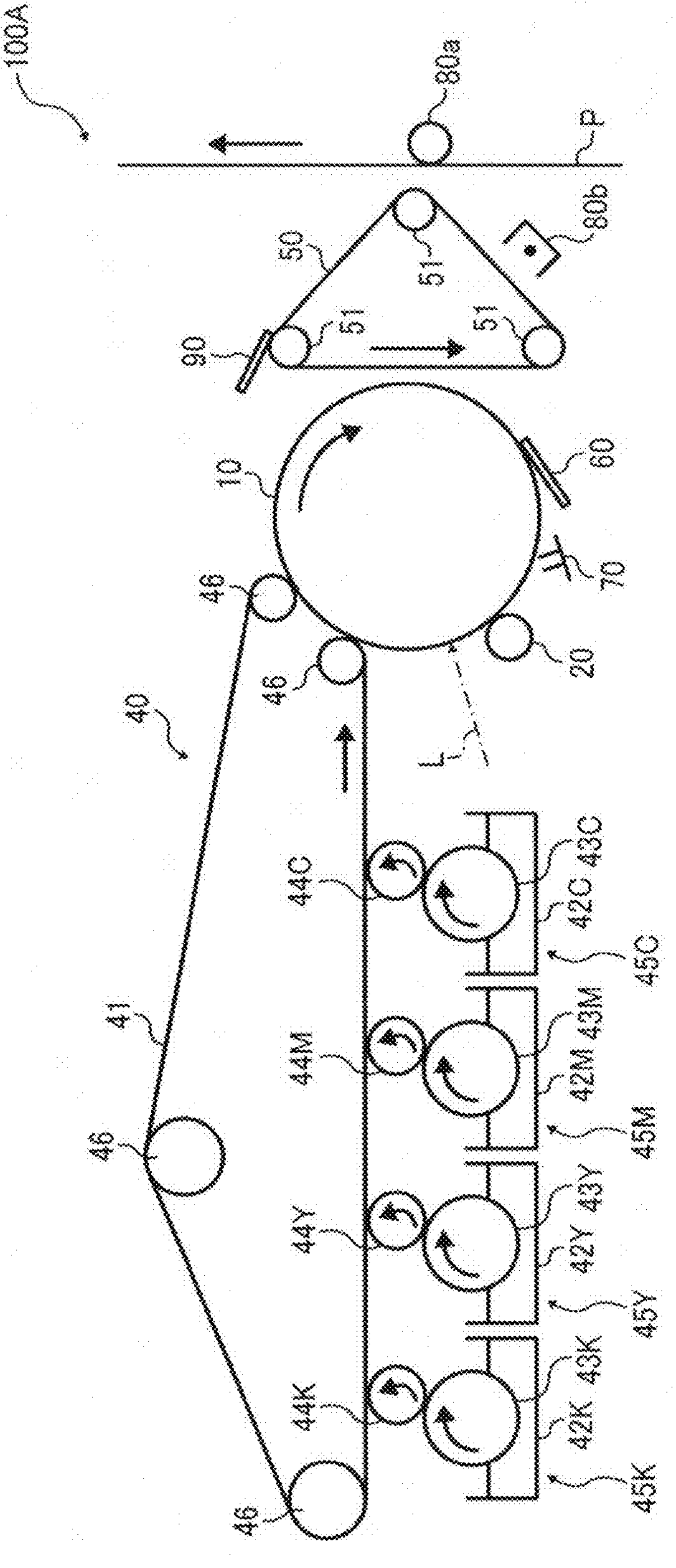
FIG. 3 is a schematic view illustrating an example of the image forming apparatus of the present invention.

FIG. 3 is a schematic view illustrating an example of the image forming apparatus of the present invention.

Referring to FIG. 3, an image forming apparatus 100A includes a photoreceptor drum 10 (hereinafter referred to as a photoreceptor) serving as an image bearing member; a charging roller 20 serving as a charging member of the charger; an irradiator (not shown) emitting light L including image information; a developing device 40; an intermediate transfer medium 50 (endless belt); a cleaning blade 60 serving as a cleaner; and a discharging lamp 70 serving as a discharger.

The intermediate transfer belt 50 is an endless belt which is rotated in a direction indicated by an arrow by three rollers 51 arranged therein while tightly stretched by the rollers. At least one of the three rollers 51 serves as a primary transfer device to apply a transfer bias (primary transfer bias) to the intermediate transfer belt 50. A belt cleaner including a cleaning blade 90 is arranged in the vicinity of the intermediate transfer belt 50 to clean the surface of the intermediate transfer belt 50. In the vicinity of the intermediate transfer belt 50, a transfer roller 80*a* serving as a secondary transfer device is provided so as to face the intermediate transfer belt 50 to apply a transfer bias (a second transfer bias) to a recording medium P on which a toner image is to be transferred by the intermediate transfer belt 50. In addition, a corona charger 80*b* is provided to charge a toner image on the intermediate transfer belt 50. The corona charger 80*b* is arranged at a location between the primary transfer position at which the photoreceptor 10 faces the intermediate transfer belt 50, and the secondary transfer position at which the intermediate transfer belt 50 faces the recording medium P.

The developing device 40 includes an endless developing belt 41, and a black developing unit 45K, a yellow developing unit 45Y, a magenta developing unit 45M, and a cyan developing unit 45C, which are arranged along the developing belt 41. Each developing unit 45 includes a developer containing portion 42 (42K, 42Y, 42M or 42C), a developer supplying roller 43 (43K, 43Y, 43M or 43C), and a developing roller 44 (44K, 44Y, 44M or 44C). The developing belt 41 is supported by four rollers 46 so as to be rotatable in a direction indicated by an arrow.

Next, the image forming operation of the image forming apparatus 100A will be described.

In the image forming apparatus 100A, the surface of the photoreceptor 10 is uniformly charged with the charging roller 20. The irradiator (not shown) irradiates the charged surface of the photoreceptor 10 with light L including image information to form an electrostatic latent image on the photoreceptor 10. The developing device 40 develops the latent image with color toners transported by the developing belt 41 to sequentially form (K, Y, M and C) color toner images on the photoreceptor 10. The color toner images thus formed on the photoreceptor 10 are transferred to the intermediate transfer medium 50 (primary transfer) to form a combined color toner image (e.g., a full color toner image) thereon while at least one of the rollers 51 applies a primary transfer bias thereto. The toner image formed on the intermediate transfer medium 50 is then transferred to the recording medium P (secondary transfer).

Particles of the toner remaining on the photoreceptor 10 after the transfer operation are removed with the cleaner 60, and charges remaining on the photoreceptor 10 are removed by the discharger 70.

Figure 4:
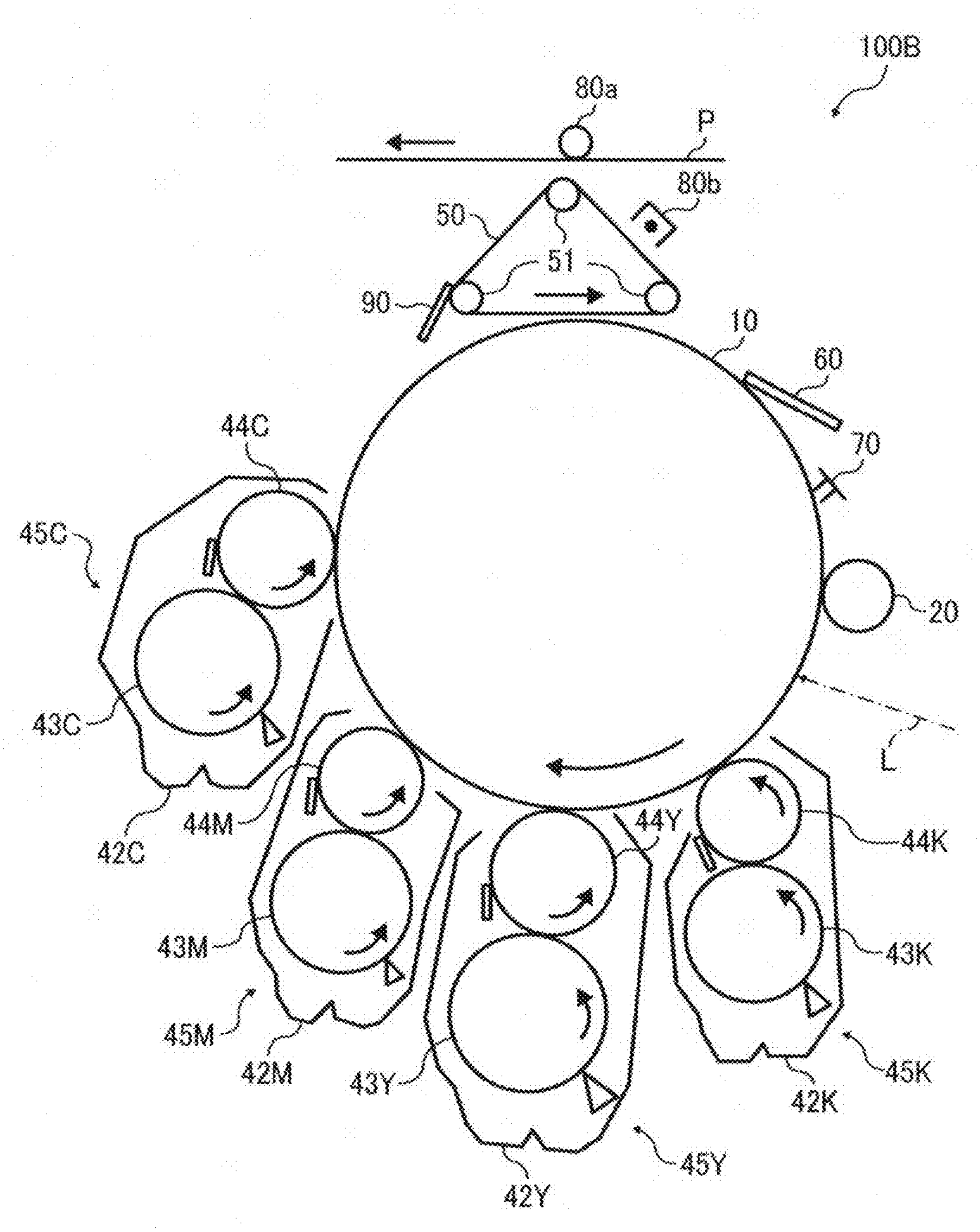
FIG. 4 is a schematic view illustrating another example of the image forming apparatus of the present invention.

A second example of the image forming apparatus of the present invention is illustrated in FIG. 4. Referring to FIG. 4, an image forming apparatus 100B has the same configuration as that of the image forming apparatus illustrated in FIG. 3 except that the developing belt 41 and the rollers 46 are not used, and the black, yellow, magenta and cyan developing units 45K, 45Y, 45M and 45C are arranged so as to face the photoreceptor 10. The developing roller 44 (44K, 44Y, 44M or 44C) transports the developer supplied by the developer supplying roller 43 (43K, 43Y, 43M or 43C) to a development region in which the developing roller 44 faces the photoreceptor 10. Since the image forming operation of the image forming apparatus is substantially the same as that of the image forming apparatus illustrated in FIG. 3, explanation of the image forming operation of this second example is omitted.

Figure 5:
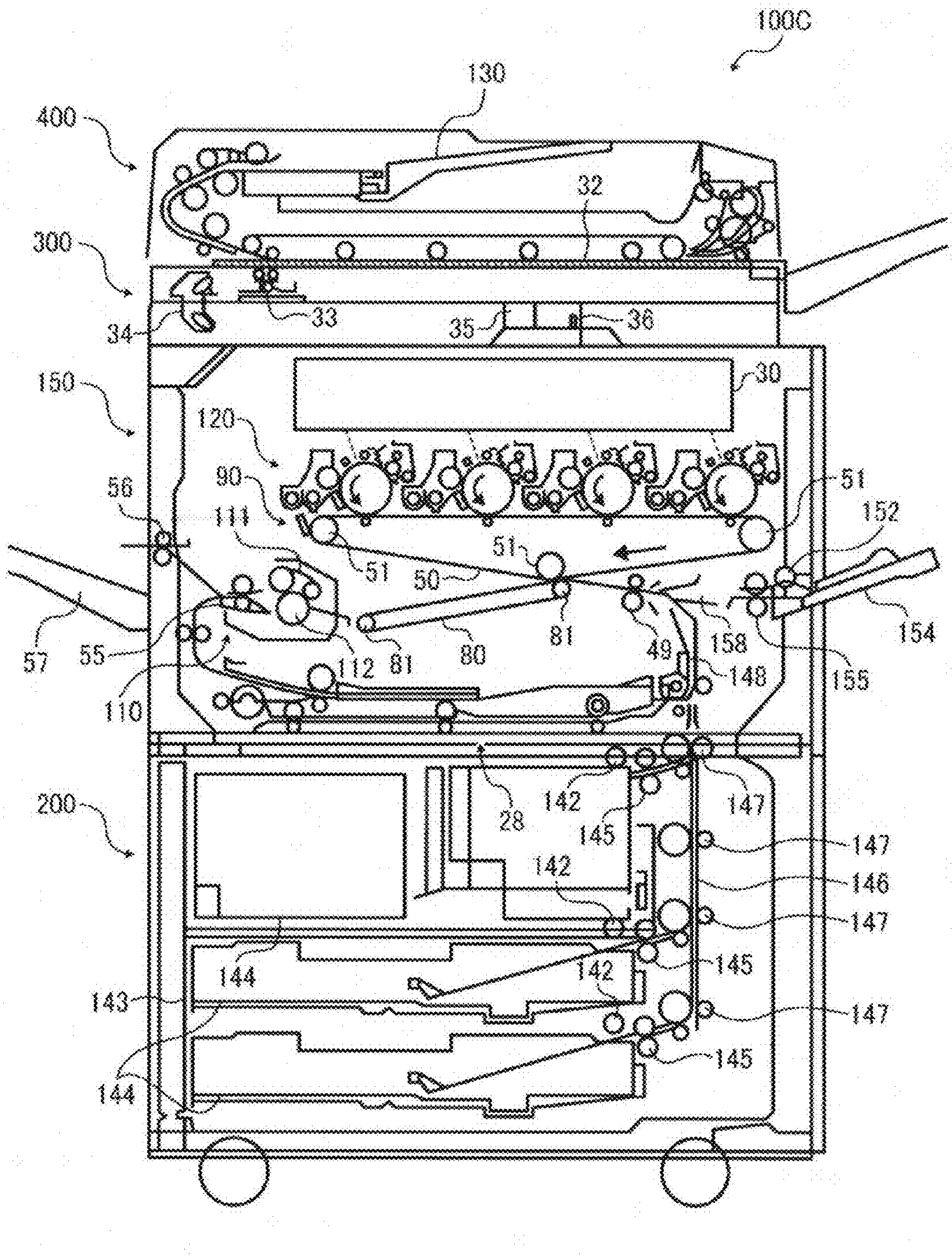
FIG. 5 is a schematic view illustrating yet another example of the image forming apparatus of the present invention.
Figure 6:
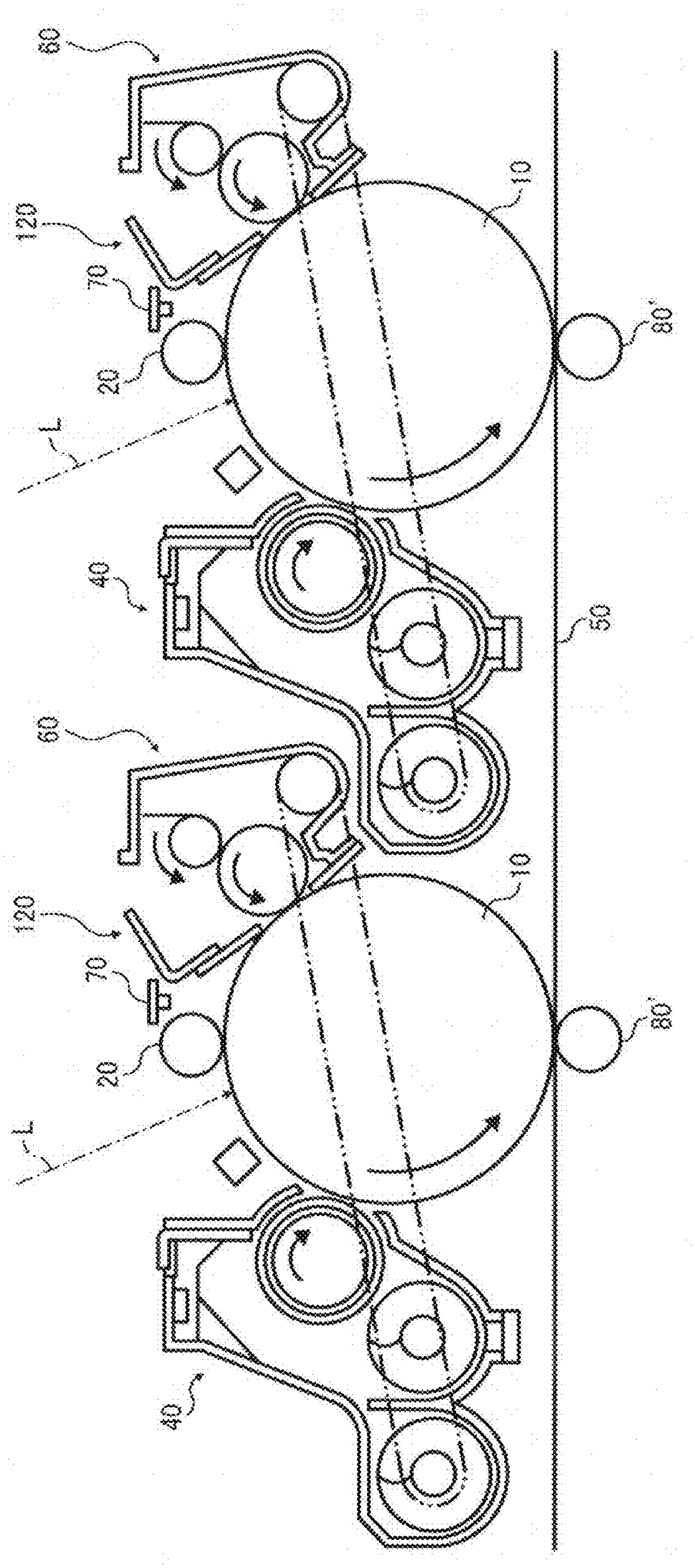
FIG. 6 is a schematic view illustrating the image forming unit of the image forming apparatus illustrated in FIG. 5.

A third example of the image forming apparatus of the present invention is illustrated in FIGS. 5 and 6.

FIG. 5 is the overview of the third example of the image forming apparatus of the present invention, which is a tandem-type color image forming apparatus, and FIG. 6 is an enlarged view illustrating the image forming section of the image forming apparatus illustrated in FIG. 5.

Referring to FIG. 5, a tandem-type color image forming apparatus 100C includes an image forming section 150, a recording medium feeding section 200, a scanner 300 and an automatic document feeder 400.

The image forming section 150 includes the endless intermediate transfer medium 50, which is provided at the center of the image forming section 150. The intermediate transfer medium 50 is rotated clockwise by the three rollers 51 while tightly stretched by the rollers. The cleaning device 90 is provided near one of the rollers 51 to remove toner particles remaining on the surface of the intermediate transfer medium 50.

Four image forming units 120 for forming yellow, magenta, cyan and black toner images are arranged side by side so as to face the intermediate transfer medium 50. Each of the image forming units 120 includes the photoreceptor 10 as illustrated in FIG. 6. Referring back to FIG. 5, an irradiator 30 to irradiate the photoreceptors 10 with light L (illustrated in FIG. 6) to form an electrostatic latent image thereon is arranged above the image forming units 120.

A secondary transfer device including an endless belt 80 is provided below the intermediate transfer medium 50. The endless belt 80 is rotated while stretched by a pair of rollers 81. The endless belt 80 feeds a recording medium so that the toner images (i.e., a combined color toner image) on the intermediate transfer medium 50 are transferred to the recording medium while sandwiched by the intermediate transfer medium 50 and the endless belt 80. A fixing device 110 is provided in the vicinity of the secondary transfer device. The fixing device 110 includes an endless belt 111 and a pressure roller 112 provided to press the endless belt 111.

In addition, a sheet reversing device 28 to reverse the recording medium is provided in the vicinity of the fixing device 110, to produce duplex copies.

Next, the full color image forming operation of the tandem-type color image forming apparatus 100C will be explained.

An original to be copied is set on an original table 130 of the automatic document feeder 400. Alternatively, the original may be directly set on a glass plate 32 of the scanner 300 after the automatic document feeder 400 is opened, followed by closing the automatic document feeder 400.

When a start button (not shown) is pushed, the color image of the original set on the glass plate 32 is scanned with a first traveler 33 and a second traveler 34, which move rightward in FIG. 5. In the case where the original is set on the table 130 of the automatic document feeder 400, the original is fed to the glass plate 32, and then the color image on the original is scanned with the first and second travelers 33 and 34. The first traveler 33 irradiates the color image on the original with light and the second traveler 34 reflects the light reflected from the color image to send the color light image to a sensor 36 via a focusing lens 35. Thus, color image information (i.e., black, yellow, magenta and cyan color image data) is provided.

The black, yellow, magenta and cyan color image data are sent to the respective black, yellow, magenta and cyan color image forming units 120, and black, yellow, magenta and cyan color toner images are formed on the respective photoreceptors 10. As illustrated in FIG. 6, each image forming unit 120 includes the photoreceptor 10, the charger 20 to charge the photoreceptor, the developing device 40 to develop an electrostatic latent image on the photoreceptor 10 with the developer of the present invention including the toner of the present invention to form a toner image on the photoreceptor 10, a primary transfer device 80' to transfer the toner image onto the intermediate transfer medium 50, the cleaner 60 to clean the surface of the photoreceptor 10, and the discharger 70 to discharge the photoreceptor 10. The image forming units 120 form K, Y, M and C toner images on the respective photoreceptors according to the color image information. The thus formed K, Y, M and C toner images are sequentially transferred onto the intermediate transfer medium 50 so as to be overlaid, resulting in formation of a combined color image (full color toner image) on the intermediate transfer medium.

Referring back to FIG. 5, in the recording medium feeding section 200, one of sheet feeding rollers 142 is selectively rotated to feed the uppermost sheet of recording medium sheets stacked in one of three sheet cassettes 144 in a sheet bank 143 while the recording medium sheet is separated one by one by a separation roller 145 when plural recording medium sheets are continuously fed. The recording sheet is fed to a passage 148 in the image forming section 150 through a passage 146 in the recording medium feeding section 200, and is stopped once by a pair of registration rollers 49. Numeral 147 denotes feed rollers. A recording medium sheet can also be fed by a feeding roller 152 from a manual sheet tray 154, and the thus fed recording medium sheet is fed to a passage 158 after separated one by one by a separation roller 155. The thus fed recording medium sheet is also stopped once by the registration rollers 49. The registration rollers 49 are generally grounded, but a bias can be applied thereto to remove paper dust therefrom.

The combined color toner image thus formed on the intermediate transfer medium 50 is transferred to the recording medium sheet, which is timely fed by the registration rollers 49, at the nip between the secondary transfer device 80 and the intermediate transfer belt 50. Particles of the toner, which remain on the surface of the intermediate transfer belt 50 even after the second image transfer operation, are removed therefrom by the cleaner 90.

The recording medium sheet bearing the combined color toner image thereon is then fed by the secondary transfer device 80 to the fixing device 110, and the color toner image is fixed on the recording medium sheet upon application of heat and pressure, resulting in formation of a fixed full color image on the recording sheet. The recording medium sheet bearing the full color toner image thereon is discharged from the image forming section 150 by a discharge roller 56 while the path is properly selected by a sheet path changing pick 55. Thus, a copy is stacked on a tray 57. When a duplex copy is produced, the recording medium sheet bearing the fixed toner image on one side thereof is fed to the sheet reversing device 28 to be reversed. The reversed recording medium sheet is then fed to the secondary transfer device 80 through the passage 148 so that a second toner image formed on the intermediate transfer medium 50 is transferred to the other side of the recording medium sheet by the secondary transfer device 80. The second toner image formed on the other side of the recording medium sheet is also fixed by the fixing device 110 and then the duplex copy is discharged by the discharge roller 56 so as to be stacked on the tray 57.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

In a reaction vessel equipped with a condenser, an agitator and a nitrogen feed pipe, a polyol component including 3-methyl-1,5-pentanediol, and a polycarboxylic acid component including dimethyl adipate (75.7% by mole), dimethyl terephthalate (19.4% by mole), dimethylsodium 5-sulfoisophthalate (1.9% by mole), and trimellitic anhydride (3.0% by mole) were mixed in a molar ratio such that the molar ratio of the hydroxyl group of the polyol component to the carboxyl group of the polycarboxylic acid component is 1.2. In this case, titanium tetraisopropoxide serving as a polymerization catalyst was added thereto in an amount of 1,000 ppm based on the total weight of the polyol component and the polycarboxylic acid component. After the mixture was heated to 200° C. over 4 hours in a nitrogen atmosphere, the components were heated to 230° C. over 2 hours, so that the components were reacted to an extent such that no component flew out. In addition, the reaction product was further reacted for 5 hours under a reduced pressure of from 10 to 15 mmHg (1,333 Pa to 2,000 Pa). Thus, a polyester initiator 1 having a number average molecular weight of 3,500 and a glass transition temperature of −10° C. was prepared.

Next, 30 parts of the polyester initiator 1 prepared above, 60 parts of L-lactide, and 10 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 14,000, a first glass transition temperature of −5° C., a second glass transition temperature of 40° C., an average domain size of the polyester block B of 50 nm, and a ratio $(HF_1-HF_2)/(HF_3-HF_4)$ of 0.30, was prepared.

Example 2

The procedure for preparation of the polyester initiator 1 in Example 1 was repeated except that the polycarboxylic acid component was replaced with a mixture of dimethyl adipate (76.6% by mole), dimethyl terephthalate (19.4% by mole), dimethylsodium 5-sulfoisophthalate (1.0% by mole), and trimellitic anhydride (3.0% by mole) to prepare a polyester initiator 2. The polyester initiator 2 had a number average molecular weight of 3,400, and a glass transition temperature of −14° C.

Next, 30 parts of the polyester initiator 2 prepared above, 60 parts of L-lactide, and 10 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 15,000, a first glass transition temperature of −7° C., a second glass transition temperature of 42° C., an average domain size of the polyester block B of 40 nm, and a ratio $(HF_1-HF_2)/(HF_3-HF_4)$ of 0.31, was prepared.

Example 3

The procedure for preparation of the polyester initiator 1 in Example 1 was repeated except that the polyol component was replaced with a mixture of 3-methyl-1,5-pentanediol (80% by mole) and 1,3-propanediol (20% by mole), and the polycarboxylic acid component was replaced with a mixture of dimethyl adipate (76.6% by mole), dimethyl terephthalate (19.4% by mole), dimethylsodium 5-sulfoisophthalate (1.0% by mole), and trimellitic anhydride (3.0% by mole) to prepare a polyester initiator 3. The polyester initiator 3 had a number average molecular weight of 3,000, and a glass transition temperature of 2° C.

Next, 30 parts of the polyester initiator 3 prepared above, 60 parts of L-lactide, and 10 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 14,000, a first glass transition temperature of 8° C., a second glass transition temperature of 45° C., an average domain size of the polyester block B of 45 nm, and a ratio $(HF_1-HF_2)/(HF_3-HF_4)$ of 0.28, was prepared.

Example 4

The procedure for preparation of the polyester initiator 1 in Example 1 was repeated except that the polyol component was replaced with a mixture of 3-methyl-1,5-pentanediol (80% by mole) and 1,3-propanediol (20% by mole), the polycarboxylic acid component was replaced with a mixture of dimethyl adipate (47.5% by mole), dimethyl terephthalate (48.5% by mole), dimethylsodium 5-sulfoisophthalate (1.0% by mole), and trimellitic anhydride (3.0% by mole), and the molar ratio of the hydroxyl group to the carboxyl group was changed to 1.3 to prepare a polyester initiator 4. The polyester initiator 4 had a number average molecular weight of 2,400, and a glass transition temperature of 10° C.

Next, 20 parts of the polyester initiator 4 prepared above, 68 parts of L-lactide, and 12 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 13,000, a first glass transition temperature of 16° C., a second glass transition temperature of 42° C., an average domain size of the polyester block B of 50 nm, and a ratio $(HF_1-HF_2)/(HF_3-HF_4)$ of 0.22, was prepared.

Example 5

The procedure for preparation of the polyester initiator 1 in Example 1 was repeated except that the polyol component was replaced with a mixture of 3-methyl-1,5-pentanediol (50% by mole) and 1,3-propanediol (50% by mole), the polycarboxylic acid component was replaced with a mixture of dimethyl adipate (47.5% by mole), dimethyl terephthalate (48.5% by mole), dimethylsodium 5-sulfoisophthalate (1.0% by mole), and trimellitic anhydride (3.0% by mole), and the molar ratio of the hydroxyl group to the carboxyl group was changed to 1.3 to prepare a polyester initiator 5. The polyester initiator 5 had a number average molecular weight of 2,600, and a glass transition temperature of 15° C.

Next, 20 parts of the polyester initiator 5 prepared above, 68 parts of L-lactide, and 12 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 13,000, a first glass transition temperature of 18° C., a second glass transition temperature of 44° C., an average domain size of the polyester block B of 50 nm, and a ratio $(HF_1-HF_2)/(HF_3-HF_4)$ of 0.19, was prepared.

Example 6

The procedure for preparation of the polyester initiator 1 in Example 1 was repeated except that the polyol component was replaced with a mixture of 3-methyl-1,5-pentanediol (50% by mole) and 1,3-propanediol (50% by mole), the polycarboxylic acid component was replaced with a mixture of dimethyl adipate (48.2% by mole), dimethyl terephthalate (49.3% by mole), dimethylsodium 5-sulfoisophthalate (1.0% by mole), and trimellitic anhydride (3.0% by mole), and the molar ratio of the hydroxyl group to the carboxyl group was changed to 1.3 to prepare a polyester initiator 6. The polyester initiator 6 had a number average molecular weight of 2,700, and a glass transition temperature of 12° C.

Next, 20 parts of the polyester initiator 6 prepared above, 68 parts of L-lactide, and 12 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 13,000, a first glass transition temperature of 19° C., a second glass transition temperature of 46° C., an average domain size of the polyester block B of 52 nm, and a ratio $(HF_1-HF_2)/(HF_3-HF_4)$ of 0.20, was prepared.

Comparative Example 1

The procedure for preparation of the polyester initiator 1 in Example 1 was repeated except that the polycarboxylic acid component was replaced with a mixture of dimethyl adipate (77.6% by mole), dimethyl terephthalate (19.4% by mole), and trimellitic anhydride (3.0% by mole) to prepare a polyester initiator 7. The polyester initiator 7 had a number average molecular weight of 3,400, and a glass transition temperature of −8° C.

Next, 30 parts of the polyester initiator 7 prepared above, 60 parts of L-lactide, and 10 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 14,000, a first glass transition temperature of 1° C., a second glass transition temperature of 39° C., an average domain size of the polyester block B of 55 nm, and a ratio $(HF_1-HF_2)/(HF_3-HF_4)$ of 0.32, was prepared.

Comparative Example 2

The procedure for preparation of the polyester initiator 1 in Example 1 was repeated except that the polyol component was replaced with a mixture of 3-methyl-1,5-pentanediol (80% by mole) and 1,3-propanediol (20% by mole), and the polycarboxylic acid component was replaced with a mixture of dimethyl adipate (77.6% by mole), dimethyl terephthalate (19.4% by mole), and trimellitic anhydride (3.0% by mole) to prepare a polyester initiator 8. The polyester initiator 8 had a number average molecular weight of 3,000, and a glass transition temperature of 5° C.

Next, 30 parts of the polyester initiator 8 prepared above, 60 parts of L-lactide, and 10 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 15,000, a first glass transition temperature of 13° C., a second glass transition temperature of 43° C., an average domain size of the polyester block B of 70 nm, and a ratio $(HF_1-HF_2)/(HF_3-HF_4)$ of 0.29, was prepared.

Comparative Example 3

The procedure for preparation of the polyester initiator 1 in Example 1 was repeated except that the polyol component was replaced with a mixture of 3-methyl-1,5-pentanediol (50% by mole) and 1,3-propanediol (50% by mole), the polycarboxylic acid component was replaced with a mixture of dimethyl adipate (28.2% by mole), dimethyl terephthalate (69.3% by mole), dimethylsodium 5-sulfoisophthalate (1.0% by mole), and trimellitic anhydride (1.5% by mole), and the molar ratio of the hydroxyl group to the carboxyl group was changed to 1.3 to prepare a polyester initiator 9. The polyester initiator 9 had a number average molecular weight of 2,700, and a glass transition temperature of 12° C.

Next, 20 parts of the polyester initiator 9 prepared above, 68 parts of L-lactide, and 12 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 14,000, a first glass transition temperature of 23° C., a second glass transition temperature of 47° C., an average domain size of the polyester block B of 54 nm, and a ratio $(HF_1-HF_2)/(HF_3-HF_4)$ of 0.30, was prepared.

Comparative Example 4

The procedure for preparation of the polyester initiator 1 in Example 1 was repeated except that the polyol component was replaced with a mixture of 3-methyl-1,5-pentanediol (80% by mole) and 1,3-propanediol (20% by mole), the polycarboxylic acid component was replaced with a mixture of dimethyl adipate (88.2% by mole), dimethyl terephthalate (9.3% by mole), dimethylsodium 5-sulfoisophthalate (1.0% by mole), and trimellitic anhydride (1.5% by mole), and the molar ratio of the hydroxyl group to the carboxyl group was changed to 1.3 to prepare a polyester initiator 10. The polyester initiator 10 had a number average molecular weight of 2,700, and a glass transition temperature of 12° C.

Next, 20 parts of the polyester initiator 10 prepared above, 68 parts of L-lactide, and 12 parts of D-lactide were fed into an autoclave reactor equipped with a thermometer and an agitator, and one part of titanium terephthalate serving as a polymerization catalyst was further added thereto, followed by nitrogen substitution. The mixture was reacted for 6 hours at 160° C. Thus, a block copolymer, which has a number average molecular weight of 13,000, a first glass transition temperature of −24° C., a second glass transition temperature of 46° C., an average domain size of the polyester block B of 58 nm, and a ratio $(HF_1-HF_2)/(HF_3-HF_4)$ of 0.25, was prepared.

The properties of the block copolymers of Examples 1-6 and Comparative Examples 1-4 are shown in Table 1 below.

TABLE 1

| | Mn | Tg1 (° C.) | Tg2 (° C.) | Average domain size (nm) | $(HF_1 - HF_2)/(HF_3 - HF_4)$ |
|---|---|---|---|---|---|
| Ex. 1 | 14,000 | −5 | 40 | 50 | 0.30 |
| Ex. 2 | 15,000 | −7 | 42 | 40 | 0.31 |
| Ex. 3 | 14,000 | 8 | 45 | 45 | 0.28 |
| Ex. 4 | 13,000 | 16 | 42 | 50 | 0.22 |
| Ex. 5 | 13,000 | 18 | 44 | 50 | 0.19 |
| Ex. 6 | 13,000 | 19 | 46 | 52 | 0.20 |
| Comp. Ex. 1 | 14,000 | 1 | 39 | 55 | 0.32 |
| Comp. Ex. 2 | 15,000 | 13 | 43 | 70 | 0.29 |
| Comp. Ex. 3 | 14,000 | 23 | 47 | 54 | 0.30 |
| Comp. Ex. 4 | 13,000 | −24 | 46 | 58 | 0.25 |

In Table 1, Mn, Tg1, and Tg2 represent the number average molecular weight, the first glass transition temperature, and the second glass transition temperature of the block copolymers, respectively.

The methods for measuring the number average molecular weight and the glass transition temperature of the polyester initiators, and the number average molecular weight, the first glass transition temperature, and the second glass transition temperature of the block copolymers are as follows.

1. Number average molecular weight

Initially, a working curve was prepared using several polystyrenes having known molecular weights and a high speed gel permeation chromatographic apparatus HLC-8220GPC from Tosoh Corp. Next, the number average molecular weight of the polyester initiators 1-10 and the block copolymers was measured by the apparatus. The measuring conditions were as follows.

Detector: RI detector

Measurement temperature: 40° C.

Moving bed: Tetrahydrofuran

Flow rate of moving bed: 0.45 ml/min

2. Glass transition temperature, first and second glass transition temperatures, and ratio $(HF_1-HF_2)/(HF_3-HF_4)$ Initially, 5 to 10 mg of a sample was contained in a sealed aluminum pan. The pan was set in a differential scanning calorimeter (DSC) Q2000 from TA Instruments to measure the glass transition temperature Tg. Specifically, the glass transition temperature of each of the polyester initiators, the first and second glass transition temperatures of each of the block copolymers, and the ratio $(HF_1-HF_2)/(HF_3-HF_4)$ of the block copolymer were determined from the thermogram (endothermic curve) in the second heating according to ASTM D3418/82.

The measuring conditions were as follows.

First heating: After the sample was heated from 30° C. to 220° C. at a temperature rising speed of 5° C./min, the temperature (220° C.) was maintained for 1 minute.

Cooling: After the sample was cooled from 220° C. to −60° C. without controlling the temperature decreasing speed, the temperature (−60° C.) was maintained for 1 minute.

Second heating: The sample was heated again from −60° C. to 180° C. at a temperature rising speed of 5° C./min to obtain a thermogram.

3. Average domain size of the polyester block B

A sample (block copolymer) was cut using an ultra-microtome ULTRACUT UCT from Leica Microsystems to obtain a section of the sample. The cutting conditions were as follows.

Thickness of cut: 60 nm

Cutting speed: 0.4 mm/sec

Diamond knife: Ultra Sonic 35°

Next, the section was observed using a tapping mode atomic force microscope MFD-3D from Asylum Technology Co., Ltd. The conditions were as follows.

Cantilever: OMCL-AC240TS-C3

Target amplitude: 0.5V

Target percentage: −5%

Amplitude setpoint: 315 mV

Scan rate: 1 Hz

Scan points: 256×256

Scan angle: 0°

In the phase image of the cross-section, thirty (30) domains, which have larger phase delay, were selected, and the maximum diameter of each domain was measured. The maximum diameters of the 30 domains were averaged to determine the average domain size.

Next, toners were prepared using the block copolymers of Examples 1-6 and Comparative Examples 1-4.

1. Preparation of toners

The following components were fed into a reaction vessel equipped with an agitator and a thermometer.

| | |
|---|---|
| Water | 600 parts |
| Styrene | 120 parts |
| Methacrylic acid | 100 parts |
| Butyl acrylate | 45 parts |
| Sodium alkylallylsulfosuccinate | 10 parts |
| (ELEMINOL JS-2 from Sanyo Chemical Industries Ltd.) | |
| Ammonium persulfate | 1 part |

After the mixture was agitated for 20 minutes by the agitator which was rotated at 400 rpm, the mixture was heated to 75° C. to perform a reaction for 6 hours. After 30 parts of 1% by weight aqueous solution of ammonium persulfate was added thereto, the mixture was aged for 6 hours at 75° C. Thus, an aqueous dispersion of a vinyl resin was prepared. The vinyl resin in the dispersion had a volume average particle diameter of 80 nm, which was measured by an electrophoretic light scattering photometer ELS-800 from Otsuka Electronics, Co., Ltd. In addition, part of the vinyl resin dispersion was dried, and the glass transition temperature of the dry vinyl resin was measured by a flow tester CFT-500D from Shimadzu Corp. As a result, the vinyl resin had a glass transition temperature of 74° C.

Next, 300 parts of water, 300 parts of the vinyl resin dispersion prepared above, and 0.2 parts of sodium dodecylbenzenesulfonate were mixed to prepare an aqueous medium.

Further, 1,000 parts of water, 530 parts of a carbon black (PRINTEX 35 from Degussa AG, which has a DBP oil absorption of 42 ml/100 g, and a pH of 9.5), and 1,200 parts of a block copolymer (i.e., each of the block copolymers of Examples 1-6 and Comparative Examples 1-4) were mixed using a HENSCHEL MIXER mixer (from Mitsui mining Co., Ltd.). The mixture was kneaded for 30 minutes at 150° C. using a two-roll kneader. After the kneaded mixture was subjected to roll cooling, the mixture was pulverized using a pulverizer from Hosokawa Micron Corp. Thus, a master batch was prepared.

After 100 parts of the block copolymer, and 100 parts of ethyl acetate were fed into a reaction vessel, the mixture was agitated, 5 parts of a carnauba wax and 5 parts of the master batch prepared above were added to the mixture. The mixture was subjected to bead milling using ULTRAVISCO MILL from Aimex Co., Ltd. The milling conditions were as follows.

Liquid feeding speed: 1 kg/hour

Peripheral speed of disc: 6 m/sec

Dispersion media: zirconia beads with a diameter of 0.5 mm

Filling factor of beads: 80% by volume

Repeat number of dispersing operation: 3 times (3 passes)

Thus, a first liquid was prepared.

Next, 150 parts of the aqueous medium prepared above was fed into a container, and the aqueous medium was agitated using a mixer, TK HOMOMIXER from PRIMIX Corp., which was rotated at 12,000 rpm. Next 100 parts of the first liquid prepared above was added thereto, and the mixture was agitated for 10 minutes to prepare a second liquid.

After 100 parts of the second liquid was fed into a flask equipped with an agitator and a thermometer, the second liquid was agitated for 10 hours at 30° C. wherein the agitator was rotated at a peripheral speed of 20 m/min, to remove the solvent. Thus, a dispersion slurry was prepared.

After 100 parts of the dispersion slurry was subjected to filtering under a reduced pressure, 100 parts of water was added to the filter cake, and the mixture was agitated for 10 minutes by a mixer TK HOMOMIXER from PRIMIX Corp., which was rotated at 12,000 rpm, followed by filtering.

The resultant filter cake (a) was mixed with 300 parts of water, and the mixture was agitated for 10 minutes with the TK HOMOMIXER mixer, which was rotated at a revolution of 12,000 rpm, followed by filtering. This washing treatment was repeated twice. Thus, a filter cake (b) was prepared.

The thus prepared filter cake (b) was mixed with 20 parts of a 10% aqueous solution of sodium hydroxide, and the mixture was agitated for 30 minutes with the TK HOMOMIXER mixer, which was rotated at a revolution of 12,000 rpm, followed by filtering under a reduced pressure. Thus, a filter cake (c) was prepared.

The filter cake (c) was mixed with 300 parts of water, and the mixture was agitated for 10 minutes with the TK HOMOMIXER mixer, which was rotated at a revolution of 12,000 rpm, followed by filtering. This washing treatment was repeated three times. Thus, a filter cake (d) was prepared.

The filter cake (d) was mixed with 20 parts of a 10% hydrochloric acid, and the mixture was agitated for 10 minutes with the TK HOMOMIXER mixer, which was rotated at a revolution of 12,000 rpm, followed by filtering. Thus, a filter cake (e) was prepared.

Next, 5% by weight methanol solution of a fluorine-containing ammonium salt (FUTARGENT F-310 from Neos Co., Ltd.), which serves as a charge controlling agent was added to the filter cake (e) in an amount such that the weight ratio of the fluorine-containing ammonium salt to the filter cake is 0.1%. The mixture was agitated for 10 minutes, and the mixture was filtered. Thus, a filter cake (f) was prepared.

The filter cake (f) was mixed with 300 parts of water and the mixture was agitated for 10 minutes with the TK HOMOMIXER mixer, whose rotor was rotated at a revolution of 12,000 rpm, followed by filtering. This washing treatment was repeated twice. Thus, a final filter cake was prepared.

The final filter cake was dried for 36 hours at 40° C. using a circulating air drier, followed by filtering using a screen having openings of 75 μm. Thus, toner particles (i.e., a mother toner) were prepared.

One hundred (100) parts of the toner particles were mixed with 1.5 parts of a hydrophobized silica TS720 from Cabot Corp. The mixture was blended for 5 minutes using a HENSCHEL MIXER mixer, which was rotated at 3,000 rpm. Thus, a toner was prepared. Namely, toners of Examples 1-6 and Comparative Examples 1-4 were prepared.

2. Preparation of carrier

The following components were mixed for 20 minutes using a homomixer to prepare a cover layer coating liquid.

| | |
|---|---|
| Toluene | 100 parts |
| Silicone resin | 100 parts |
| (SR2411 from Dow Corning Toray Silicone Co., Ltd.) | |
| γ-(2-Aminoethyl)aminopropyltrimethoxysilane | 5 parts |
| Carbon black | 10 parts |

A spherical magnetite having a particle diameter of 50 μm was coated with the cover layer coating liquid prepared above using a fluidized bed type coating device. Thus, a magnetic carrier having a cover layer was prepared.

3. Preparation of two component developer

Five (5) parts of each toner was mixed with 95 parts of the magnetic carrier prepared above to prepare two component developers.

The toners were evaluated with respect to low temperature fixability, high temperature preservability, pigment dispersing property, and diameter of pigment dispersed in toner. The evaluation methods are as follows.

1. Low temperature fixability (LTF)

Each developer was set in a copier MF-200 from Ricoh Co., Ltd., which had been modified such that a roller made of TEFLON is used as the fixing roller, and black solid images were produced under the following conditions.

Temperature of fixing roller: changed from 120° C. to 140° C.

Recording medium: THICK COPY PAPER <135> from Ricoh Business Expert, Ltd.

Weight of solid image: 0.85±0.1 mg/$cm^2$

Each of the solid images was rubbed with a white cotton pad 5 times. The image density of the solid image was measured with a spectro-densitometer before and after the rubbing test to determine the ratio (IDa/IDb) of the image density (IDa) after the rubbing test to the image density (IDb) before the rubbing test. In this regard, the minimum fixable temperature is defined as a minimum fixing temperature, above which the ratio (IDa/IDb) is not less than 70%.

The low temperature fixability was graded as follows.

⊚: The minimum fixing temperature is lower than 120° C. (Excellent)

○: The minimum fixing temperature is not lower than 120° C. and lower than 130° C. (Good)

Δ: The minimum fixing temperature is not lower than 130° C. and lower than 140° C. (Acceptable)

X: The minimum fixing temperature is not lower than 140° C. (Bad)

2. High temperature preservability (HTP)

The high temperature preservability of each toner was evaluated using the method for measuring penetration based on JIS K2235-1991, which is as follows.

(1) At first, a sample (toner) is fed into a 50 ml glass container;

(2) the container is allowed to settle for 24 hours in a chamber heated to 50° C.;

(3) the toner in the container is cooled to 24° C.; and (4) the toner is subjected to a penetration test in which a needle is penetrated into the toner layer at a predetermined pressure and the length (L) of the part of the needle penetrated into the toner layer is measured.

In this regard, the longer penetration length (L) a toner has, the better high temperature preservability the toner has. The high temperature preservability is graded as follows:

⊚: The penetration length (L) is not shorter than 25 mm. (Excellent)

○: The penetration length (L) is shorter than 25 mm and not shorter than 15 mm. (Good)

Δ: The penetration length (L) is shorter than 15 mm and not shorter than 5 mm. (Acceptable)

X: The penetration length (L) is shorter than 5 mm. (Bad)

3. Pigment dispersing property and diameter of pigment dispersed in toner

The pigment dispersing property of each toner and the diameter of the pigment dispersed in the toner were evaluated using a transmission electron microscope H7000 from Hitachi High-Technologies Corp.

Specifically, a proper amount of toner was set on a micron grid from Nisshin EM Corp., and a transmission electron micrograph of the toner was taken under conditions of 100 kV in accelerated voltage and 50000 times power in magnification. The transmission electron micrograph was visually observed to determine whether the pigment is uniformly dispersed in the toner (i.e., to evaluate the pigment dispersing property of the toner). In addition, the transmission electron micrograph was subjected to a binary image processing to determine the average circle-equivalent diameter of 100 pigment particles in the toner, which is defined as the diameter of the pigment dispersed in the toner.

The pigment dispersing property of toner is graded as follows:

◎: The pigment is uniformly dispersed in the toner. (Excellent)

○: Several pigment particles are eccentrically located on the surface of the toner. (Good)

X: All the pigment particles are eccentrically located on the surface of the toner. (Bad)

The diameter of the pigment dispersed in the toner is graded as follows:

◎: The diameter is less than 150 nm. (Excellent)

○: The diameter is not less than 150 nm and less than 250 nm (Good).

X: The diameter is not less than 250 nm. (Bad)

The evaluation results of the low temperature fixability, the high temperature preservability, the pigment dispersing property, and the diameter of pigment dispersed in toner are shown in Table 2 below.

TABLE 2

| | Low temperature fixability | High temperature preservability | Pigment dispersing property | Diameter of pigment dispersed in toner |
|---|---|---|---|---|
| Ex. 1 | ◎ | Δ | ◎ | ◎ |
| Ex. 2 | ◎ | Δ | ◎ | ○ |
| Ex. 3 | ○ | ○ | ○ | ◎ |
| Ex. 4 | Δ | ◎ | ○ | ◎ |
| Ex. 5 | Δ | ◎ | ○ | ○ |
| Ex. 6 | Δ | ◎ | ○ | ○ |
| Comp. Ex. 1 | ◎ | ○ | X | X |
| Comp. Ex. 2 | ○ | ○ | X | ○ |
| Comp. Ex. 3 | X | ◎ | ○ | ○ |
| Comp. Ex. 4 | ◎ | X | ○ | ○ |

It is clear from Table 2 that the toners including one of the block copolymers of Examples 1-6 have a good combination of low temperature fixability, high temperature preservability, pigment dispersing property, and diameter of pigment dispersed in toner.

In contrast, all the pigment particles are present on the surface of the toners including one of the block copolymers of Comparative Examples 1 and 2. The reason therefor is considered to be that the block copolymers of Comparative Examples 1 and 2 do not have a polyester block B having an anionic group.

The toner including the block copolymers of Comparative Example 3 has bad low temperature fixability. The reason therefor is considered to be that the first glass transition temperature of the block copolymer is 23° C., which is higher than the preferable range of from −20° C. to 20° C.

The toner including the block copolymers of Comparative Example 4 has bad high temperature preservability. The reason therefor is considered to be that the first glass transition temperature of the block copolymer is −24° C., which is lower than the preferable range of from −20° C. to 20° C.

Additional modifications and variations of the present invention are possible in light of the above teachings. It is therefore to be understood that within the scope of the appended claims the invention may be practiced other than as specifically described herein.

What is claimed is:

1. A block copolymer comprising a polyester block A including a residual group of a hydroxycarboxylic acid; and a polyester block B including an anionic group, wherein the anionic group includes a group having a formula $—SO_3^-$, wherein the block copolymer has a configuration such that when a cross-section of the block copolymer is observed by a tapping mode atomic force microscope to obtain a phase image of the cross-section, the polyester block B, which has relatively large phase delay, is dispersed as domains having an average domain size of from 20 nm to 100 nm in a domain of the polyester block A, which has relatively small phase delay, and wherein the block copolymer has a first glass transition temperature of from −20° C. to 20° C., and a second glass transition temperature of from 35° C. to 65° C. when the first and second glass transition temperatures are determined from a thermogram obtained by subjecting the block copolymer to differential scanning calorimetry (DSC) at a temperature rising speed of 5° C./min.

2. A toner comprising:

a pigment; and a block copolymer having a polyester block A including a residual group of a hydroxycarboxylic acid, and a polyester block B including an anionic group, wherein the anionic group includes a group having a formula $—SO_3^-$, wherein the block copolymer has a configuration such that when a cross-section of the block copolymer is observed by a tapping mode atomic force microscope to obtain a phase image of the cross-section, the polyester block B, which has relatively large phase delay, is dispersed as domains having an average domain size of from 20 nm to 100 nm in a domain of the polyester block A, which has relatively small phase delay, and wherein the block copolymer has a first glass transition temperature of from −20° C. to 20° C., and a second glass transition temperature of from 35° C. to 65° C. when the first and second glass transition temperatures are determined from a thermogram obtained by subjecting the block copolymer to differential scanning calorimetry (DSC) at a temperature rising speed of 5° C./min.

3. The toner according to claim 2, wherein the toner satisfies the following relation:

$$0<(HF_1-HF_2)/(HF_3-HF_4)\leq 1$$

wherein $HF_1$ represents flow of heat at an intersection between a first tangent line, which is drawn at an inflection point of a heat flow curve of the thermogram to determine the first glass transition temperature, and a first base line of the heat flow curve, $HF_2$ represents flow of heat at an intersection between the first tangent line and a second base line of the heat flow curve, $HF_3$ represents flow of heat at an intersection between a second tangent line, which is drawn at another inflection point of the heat flow curve to determine the second glass transition temperature, and the second base line of the heat flow curve, and $HF_4$ represents flow of heat at an intersection between the second tangent line and a third base line of the heat flow curve.

4. The toner according to claim 2, wherein the polyester block A includes a residual group of lactide of lactic acid.

5. The toner according to claim 2, wherein the polyester block B includes a residual group of a polyester having two or more hydroxyl groups, and the anionic group.

6. The toner according to claim 5, wherein the polyester block B has a number average molecular weight of from 3,000 to 5,000.

7. The toner according to claim 2, wherein the polyester block B includes a residual group of a polyol and a residual group of a polycarboxylic acid.

8. The toner according to claim 7, wherein the polyester block B has a number average molecular weight of from 3,000 to 5,000.

9. The toner according to claim 7, wherein the polyester block B has a branched structure.

10. The toner according to claim 2, wherein the block copolymer includes the polyester block B in an amount of from 25% by weight to 50% by weight.

11. The toner according to claim 2, wherein the block copolymer has a number average molecular weight of not greater than 20,000.

12. A developer comprising:

the toner according to claim 2; and a carrier.

13. An image forming apparatus comprising:

a photoreceptor;

a charger to charge the photoreceptor;

an irradiator to irradiate the charged photoreceptor to form an electrostatic latent image on the photoreceptor;

a developing device to develop the electrostatic latent image with a developer including the toner according to claim 2 to form a toner image on the photoreceptor;

a transferring device to transfer the toner image onto a recording medium; and a fixing device to fix the toner image on the recording medium.

* * * * *